United States Patent
Chen et al.

(10) Patent No.: US 9,622,230 B2
(45) Date of Patent: Apr. 11, 2017

(54) NARROW BAND PARTITIONING AND EFFICIENT RESOURCE ALLOCATION FOR LOW COST USER EQUIPMENTS

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 13/896,139

(22) Filed: May 16, 2013

(65) Prior Publication Data
US 2013/0322363 A1 Dec. 5, 2013

Related U.S. Application Data

(60) Provisional application No. 61/648,512, filed on May 17, 2012, provisional application No. 61/648,716, filed on May 18, 2012.

(51) Int. Cl.
*H04W 72/04* (2009.01)
*H04L 5/00* (2006.01)

(52) U.S. Cl.
CPC ........... *H04W 72/042* (2013.01); *H04L 5/001* (2013.01); *H04L 5/0048* (2013.01); *H04L 5/0053* (2013.01); *H04L 5/0094* (2013.01); *H04W 72/0453* (2013.01)

(58) Field of Classification Search
CPC .... H04W 28/06; H04W 72/02; H04W 72/042

USPC ......................................... 370/310, 328, 329
See application file for complete search history.

(56) References Cited

U.S. PATENT DOCUMENTS

| | | | |
|---|---|---|---|
| 9,301,282 B2 * | 3/2016 | Lim | H04W 72/04 |
| 2010/0067469 A1 * | 3/2010 | Gaal et al. | 370/329 |
| 2010/0260081 A1 | 10/2010 | Damnjanovic et al. | |
| 2010/0272036 A1 * | 10/2010 | Ramakrishna | H04L 5/0039 370/329 |
| 2011/0195733 A1 * | 8/2011 | Zheng | H04W 72/042 455/509 |

(Continued)

OTHER PUBLICATIONS

International Search Report and Written Opinion—PCT/US2013/041508—ISA/EPO—Mar. 21, 2014.

(Continued)

*Primary Examiner* — Chi H Pham
*Assistant Examiner* — Robert Lopata
(74) *Attorney, Agent, or Firm* — Patterson & Sheridan, L.L.P.

(57) ABSTRACT

Aspects of the present disclosure relate to techniques that may be utilized to perform communications using narrow bands partitioned from available bandwidth. In some cases, a base station may select at least one narrow band, from a number of narrow bands partitioned from an available system bandwidth, for communications with a user equipment (UE), signal information regarding the selected narrow band to the UE, and communicat with the UE using the selected narrow band. The UE may receive the information regarding the selected at least one narrow band, and communicate with at least one base station using the at least one narrow band.

134 Claims, 16 Drawing Sheets

(56) References Cited

U.S. PATENT DOCUMENTS

| | | | |
|---|---|---|---|
| 2011/0222525 A1* | 9/2011 | Kishigami | H04J 11/005 |
| | | | 370/343 |
| 2011/0274074 A1* | 11/2011 | Lee | H04L 5/0053 |
| | | | 370/329 |
| 2012/0106374 A1 | 5/2012 | Gaal et al. | |
| 2012/0230271 A1 | 9/2012 | Kim et al. | |
| 2012/0236802 A1* | 9/2012 | Gong | 370/329 |
| 2012/0238310 A1 | 9/2012 | Xiao et al. | |
| 2013/0064119 A1 | 3/2013 | Montojo et al. | |
| 2013/0083749 A1* | 4/2013 | Xu et al. | 370/329 |
| 2013/0083753 A1* | 4/2013 | Lee | H04W 72/0453 |
| | | | 370/329 |
| 2013/0089067 A1 | 4/2013 | Ji et al. | |
| 2013/0182680 A1* | 7/2013 | Choi et al. | 370/331 |
| 2013/0201936 A1* | 8/2013 | Chen et al. | 370/329 |
| 2013/0208664 A1* | 8/2013 | Viswanathan | 370/329 |
| 2013/0272215 A1* | 10/2013 | Khoryaev et al. | 370/329 |
| 2013/0301552 A1* | 11/2013 | Xu et al. | 370/329 |
| 2013/0322413 A1* | 12/2013 | Pelletier | H04W 72/1289 |
| | | | 370/336 |
| 2014/0029568 A1* | 1/2014 | Wang et al. | 370/330 |
| 2014/0098777 A1* | 4/2014 | Lim | H04W 72/0413 |
| | | | 370/329 |
| 2014/0241234 A1* | 8/2014 | Zhu et al. | 370/312 |
| 2014/0286293 A1* | 9/2014 | Jang | H04L 5/0044 |
| | | | 370/329 |

OTHER PUBLICATIONS

NEC Group: "Maximum bandwidth reduction for low-cost MTC UE based on LTE", 3GPP Draft; R1-120259, 3rd Generation Partnership Project (3GPP), Mobile Competence Centre; 650, Route Des Lucioles; F-06921 Sophia-Antipolis Cedex; France, vol. RAN WG1, No. Dresden, Germany; Feb. 6, 2012-Feb. 10, 2012, Jan. 31, 2012 (Jan. 31, 2012), XP050562813, title section 2.2 Bandwidth sharing.

QUALCOMM Incorporated: "Impact of Reduction of Maximum Bandwidth on MTC", 3GPP Draft; R1-120563 Impact of Reduction of Maximum BW for MTC, 3rd Generation Partnership Project (3GPP), Mobile Competence Centre; 650, Route Des Lucioles; F-06921 Sophia-Antipolis Cedex; France, vol. RAN WG1, No. Dresden, Germany; Feb. 6, 2012-Feb. 10, 2012, Jan. 31, 2012 (Jan. 31, 2012), XP050563001, [retrieved on Jan. 31, 2012] A the whole document.

* cited by examiner

NARROW BAND PARTITIONING AND EFFICIENT RESOURCE ALLOCATION FOR LOW COST USER EQUIPMENTS

CLAIM OF PRIORITY UNDER 35 U.S.C. §119

The present application for patent claims priority to U.S. Provisional Application No. 61/648,512, filed May 17, 2012, and Application No. 61/648,716, filed May 18, 2012, both of which are assigned to the assignee hereof and hereby expressly incorporated by reference herein.

FIELD

Certain embodiments of the present disclosure generally relate to wireless communication and, more particularly, to techniques for communicating using narrow band partitions of available bandwidth.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Some systems may utilize a relay base station that relays messages between a donor base station and wireless terminals. The relay base station may communicate with the donor base station via a backhaul link and with the terminals via an access link. In other words, the relay base station may receive downlink messages from the donor base station over the backhaul link and relay these messages to the terminals over the access link. Similarly, the relay base station may receive uplink messages from the terminals over the access link and relay these messages to the donor base station over the backhaul link.

SUMMARY

Certain aspects of the present disclosure provide a method for wireless communications by a user equipment (UE). The method generally includes receiving information regarding at least one narrow band, selected from a number of narrow bands partitioned from an available system bandwidth, for communications with at least one base station and communicating with the at least one base station using the at least one narrow band.

Certain aspects of the present disclosure provide a method for wireless communications by a transmission point (TP). The method generally includes selecting at least one narrow band, from a number of narrow bands partitioned from an available system bandwidth, for communications with a user equipment (UE), signaling information regarding the selected narrow band to the UE, and communicating with the UE using the selected narrow band.

Certain aspects of the present disclosure provide an apparatus for wireless communications by a user equipment (UE). The apparatus generally includes means for receiving information regarding at least one narrow band, selected from a number of narrow bands partitioned from an available system bandwidth, for communications with at least one base station and means for communicating with the at least one base station using the at least one narrow band.

Certain aspects of the present disclosure provide an apparatus for wireless by a base station. The apparatus generally includes means for selecting at least one narrow band, from a number of narrow bands partitioned from an available system bandwidth, for communications with a user equipment (UE), means for signaling information regarding the selected narrow band to the UE, and means for communicating with the UE using the selected narrow band.

Certain aspects of the present disclosure provide an apparatus for wireless communications by a user equipment (UE). The apparatus generally includes at least one processor configured to receive information regarding at least one narrow band, selected from a number of narrow bands partitioned from an available system bandwidth, for communications with at least one base station and communicate with the at least one base station using the at least one narrow band; and a memory coupled with the at least one processor.

Certain aspects of the present disclosure provide an apparatus for wireless communications by a base station. The apparatus generally includes at least one processor configured to select at least one narrow band, from a number of narrow bands partitioned from an available system bandwidth, for communications with a user equipment (UE), signal information regarding the selected narrow band to the UE, and communicate with the UE using the selected narrow band; and a memory coupled with the at least one processor.

Certain aspects of the present disclosure provide a program product for wireless communications by a user equipment (UE) comprising a computer readable medium having instructions stored thereon. The instructions generally include instructions for receiving information regarding at least one narrow band, selected from a number of narrow bands partitioned from an available system bandwidth, for communications with at least one base station and communicating with the at least one base station using the at least one narrow band.

Certain aspects of the present disclosure provide a program product for wireless communications by a base station comprising a computer readable medium having instructions stored thereon. The instructions generally include instructions for selecting at least one narrow band, from a number of narrow bands partitioned from an available system bandwidth, for communications with a user equipment (UE), signaling information regarding the selected narrow band to the UE, and communicating with the UE using the selected narrow band.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
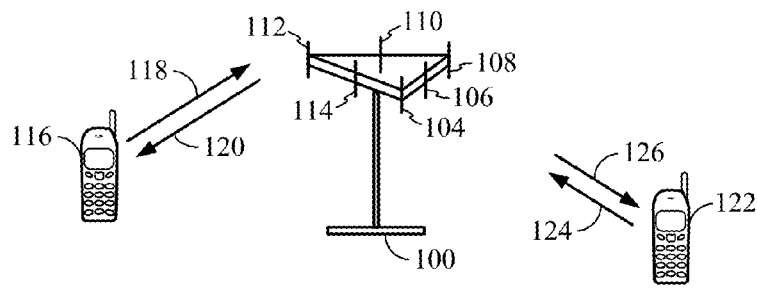
FIG. 1 illustrates a multiple access wireless communication system, according to aspects of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, or some other terminology.

Figure 2:
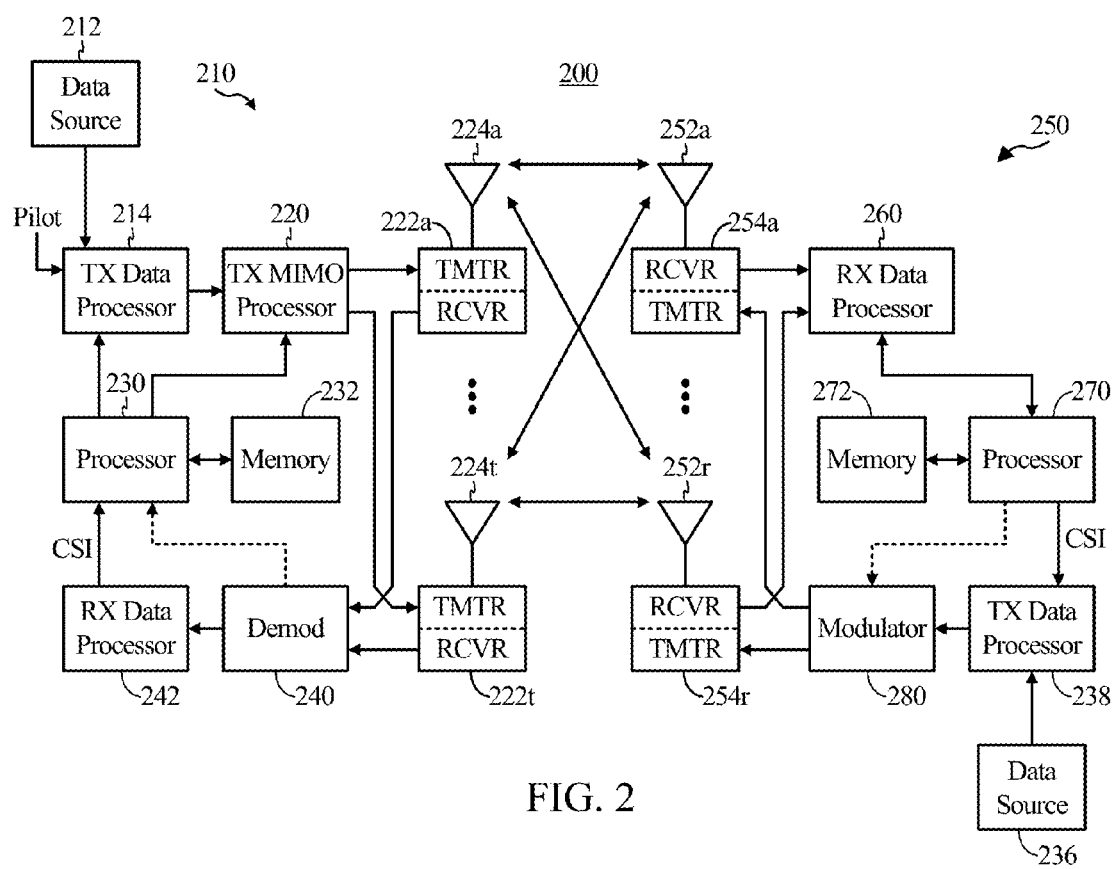
FIG. 2 is a block diagram of a communication system, according to aspects of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

In an aspect, a channel structure is provided that preserves low PAPR (at any given time, the channel is contiguous or uniformly spaced in frequency) properties of a single carrier waveform.

For the purposes of the present document, the following abbreviations apply:

AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel CP Cyclic Prefix
CRC Cyclic Redundancy Check
CTCH Common Traffic CHannel
DCCH Dedicated Control CHannel
DCH Dedicated CHannel
DL DownLink
DL-SCH DownLink Shared CHannel
DM-RS DeModulation-Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multimedia Broadcast Single Frequency Network
  MCE MBMS Coordinating Entity
  MCH Multicast CHannel
  MSCH MBMS Control CHannel
  PDCCH Physical Downlink Control CHannel
  PDSCH Physical Downlink Shared CHannel
  PRB Physical Resource Block
  VRB Virtual Resource Block
In addition, Rel-8 refers to Release 8 of the LTE standard.

Figure 3:
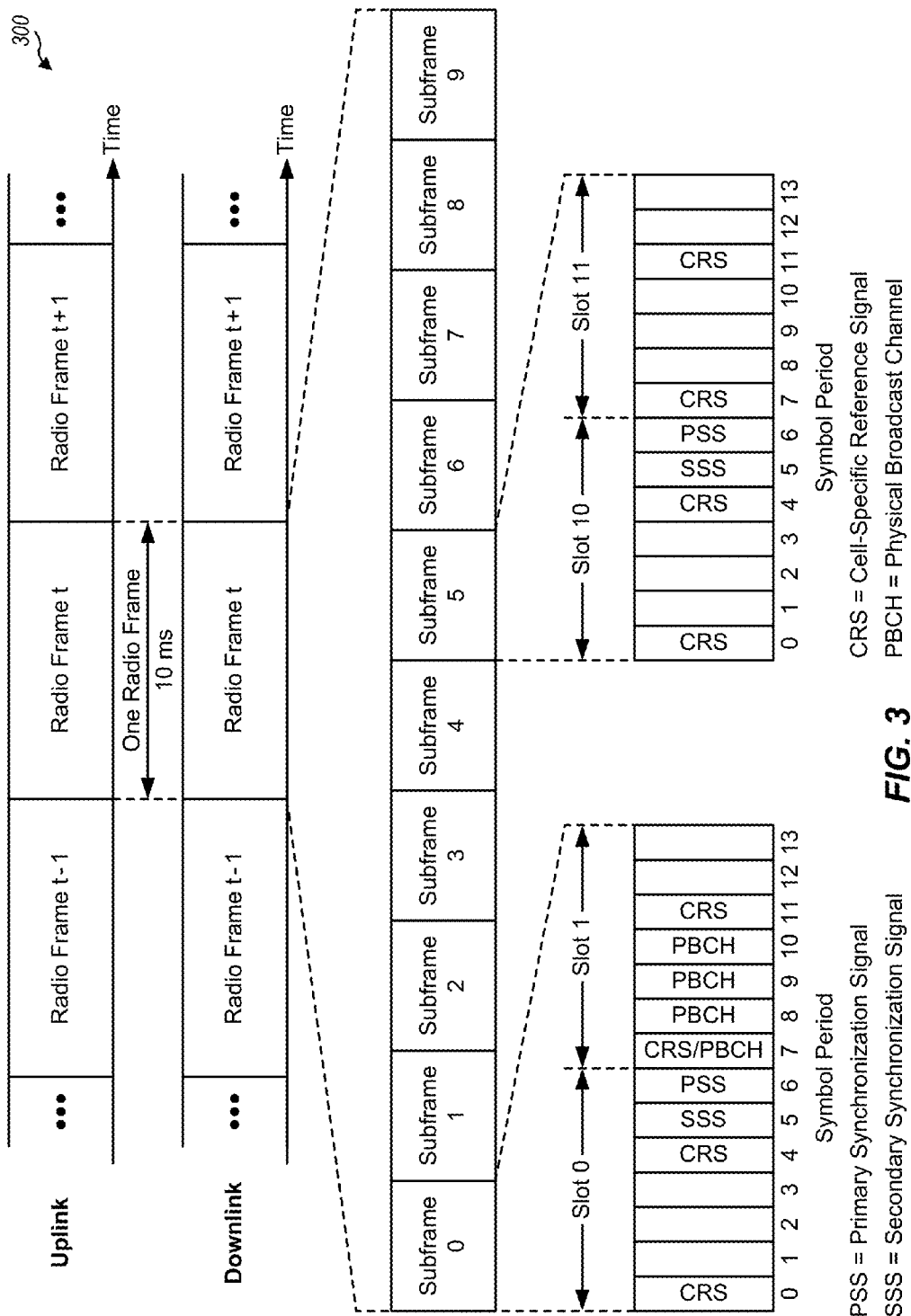
FIG. 3 illustrates an example frame structure, according to aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. During cell search and acquisition the terminal detects the cell frame timing and the physical-layer identity of the cell from which the terminal learns the start of the references-signal sequence (given by the frame timing) and the reference-signal sequence of the cell (given by the physical layer cell identity). The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
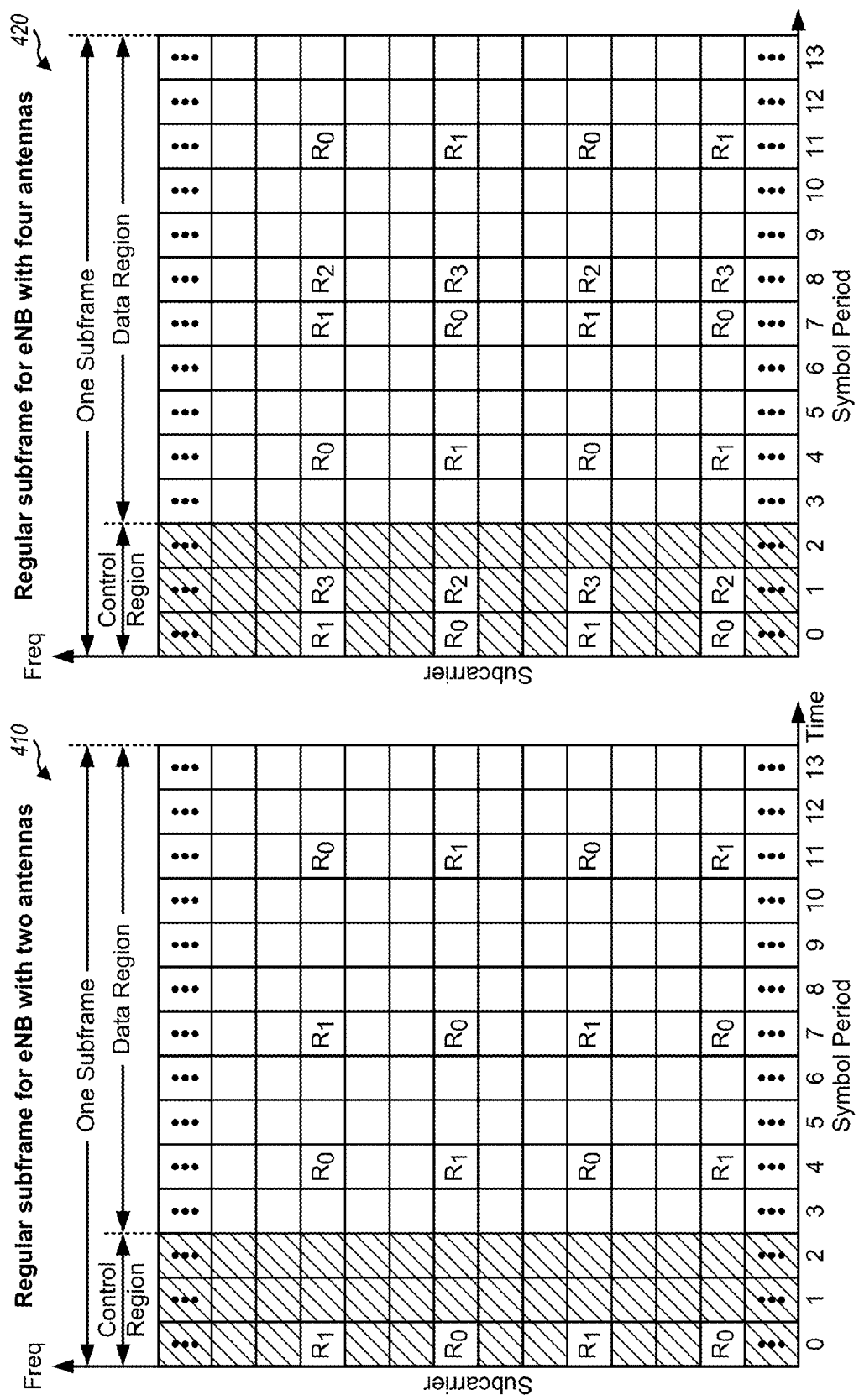
FIG. 4 illustrates an example subframe resource element mapping, according to aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Carrier Aggregation

Figure 5:
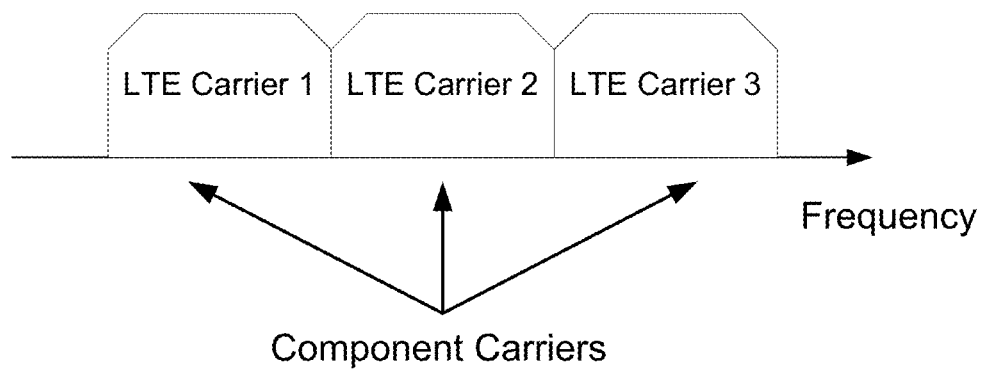
FIG. 5 illustrates continuous carrier aggregation, in accordance with certain aspects of the disclosure.
Figure 6:
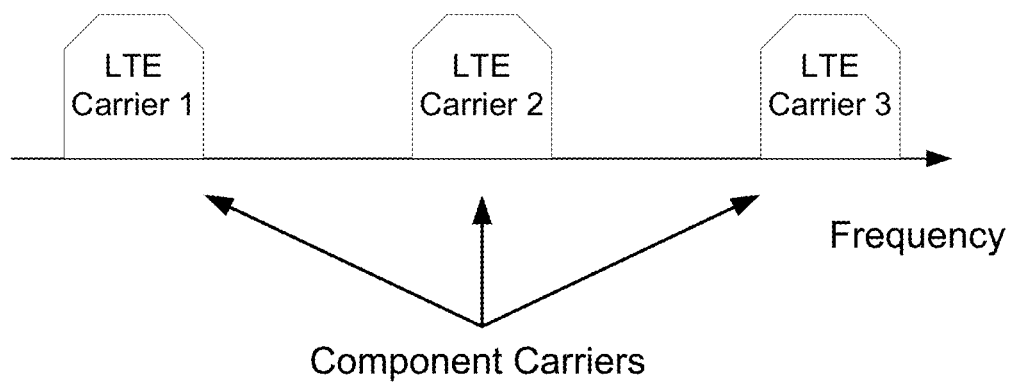
FIG. 6 illustrates non-continuous carrier aggregation, in accordance with certain aspects of the disclosure.
Figure 7:
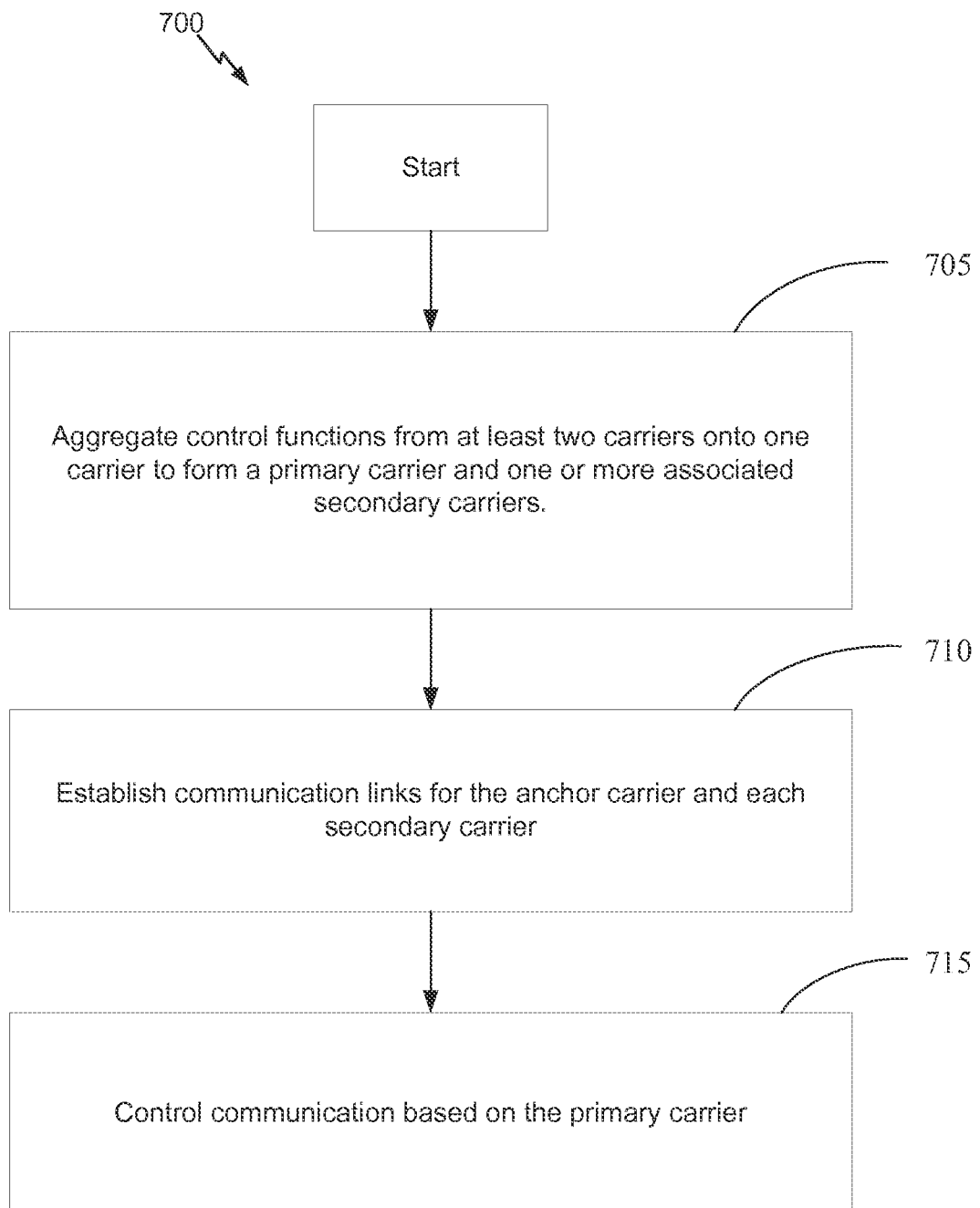
FIG. 7 illustrates example operations, in accordance with certain aspects of the disclosure.

LTE-Advanced UEs may use spectrum of up to 20 MHz bandwidths allocated in a carrier aggregation of up to a total of 100 MHz (5 component carriers) used for transmission in each direction. For the LTE-Advanced mobile systems, two types of carrier aggregation (CA) methods have been proposed, continuous CA and non-continuous CA. They are illustrated in FIGS. 5 and 6. Non-continuous CA occurs when multiple available component carriers are separated along the frequency band (FIG. 6). On the other hand, continuous CA occurs when multiple available component carriers are adjacent to each other (FIG. 5). Both non-continuous and continuous CA aggregate multiple LTE/component carriers to serve a single unit of LTE Advanced UE. According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). FIG. 7 illustrates a method 700 for controlling radio links in a multiple carrier wireless communication system by grouping physical channels according to one example. As shown, the method includes, at block 705, aggregating control functions from at least two carriers onto one carrier to form a primary carrier and one or more associated secondary carriers. Next at block, 710, communication links are established for the primary carrier and each secondary carrier. Then, communication is controlled based on the primary carrier in block 715.

New Carrier Type

Previously, LTE-A standardization has required carriers to be backward-compatible, which enabled a smooth transition to new releases. However, this required the carriers to continuously transmit common reference signals (CRS, also referred to as cell-specific reference signals) in every subframe across the bandwidth. Most cell site energy consumption is caused by the power amplifier since the cell remains on even when only limited control signalling is being transmitted, causing the amplifier to continue to consume energy. A new carrier type allows temporarily switching off of cells by removing transmission of CRS in four out of five sub frames. This reduces power consumed by the power amplifier. It also reduces the overhead and interference from CRS since the CRS won't be continuously transmitted in every subframe across the bandwidth. CRS were introduced in release 8 of LTE and are LTE's most basic downlink reference signal. They are transmitted in every resource block in the frequency domain and in every downlink subframe. CRS in a cell can be for one, two, or four corresponding antenna ports. CRS may be used by remote terminals to estimate channels for coherent demodulation. In addition, the new carrier type allows the downlink control channels to be operated using UE-specific Demodulation Reference Symbols. The New Carrier Type might be operated as a kind of extension carrier along with another LTE/LTE-A carrier or alternatively as standalone non-backward compatible carrier.

Narrow Band Partitioning and Efficient Resource Allocation for Low Cost User Equipments In LTE Rel-8/9/10, PDCCH may be located in the first several symbols of a subframe. PDCCH may be fully distributed in the entire system bandwidth. PDCCH may be time division multiplexed with PDSCH. Effectively, in Rel-8/9/10, a subframe may be divided into a control region and a data region.

In Rel-11, a new control (e.g., enhanced PDCCH (EPDCCH)) may be introduced. Unlike legacy PDCCH, which occupies the first several control symbols in a subframe, EPDCCH may occupy the data region, similar to PDSCH. EPDCCH may help increase control channel capacity, support frequency-domain ICIC, achieve improved spatial reuse of control channel resource, support beamforming and/or diversity, operate on the new carrier type and in MBSFN subframes, and coexist on the same carrier as legacy UEs.

Figure 8:
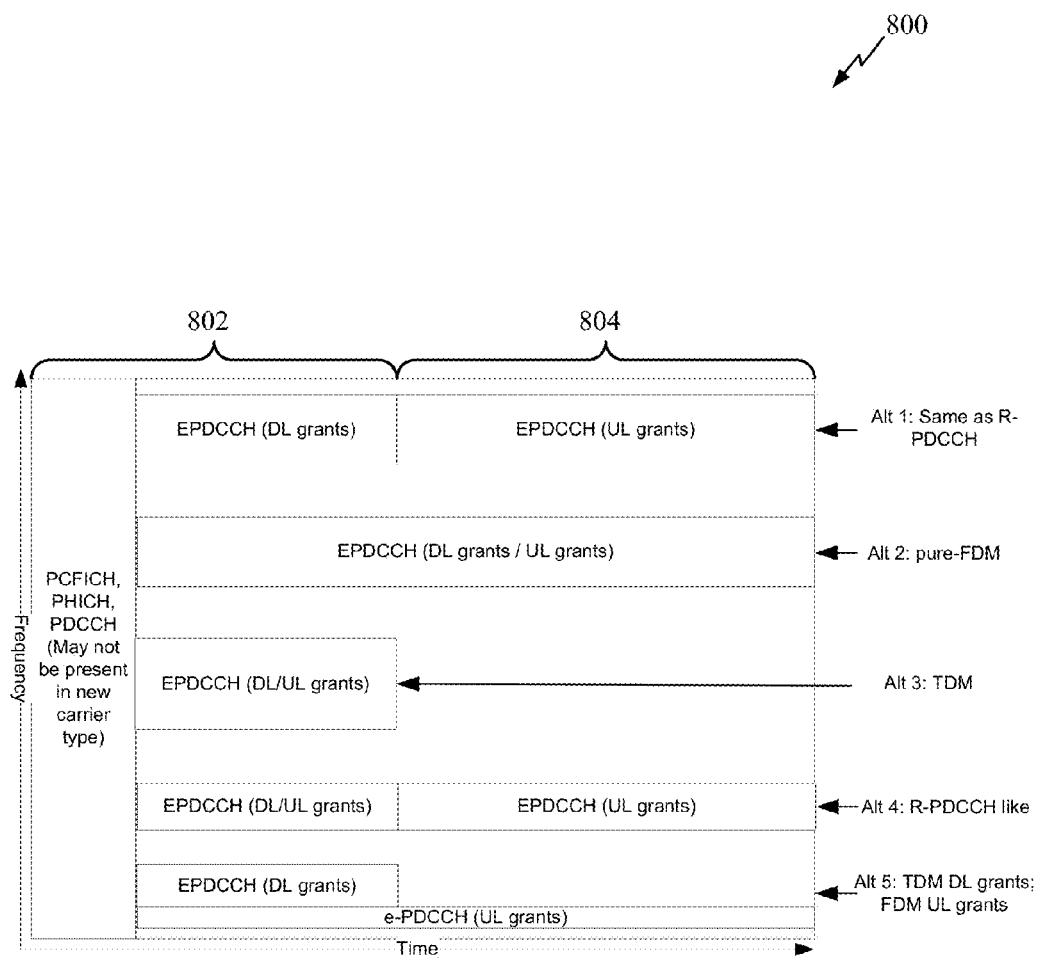
FIG. 8 illustrates an example subframe according to an aspect of the present disclosure.

FIG. 8 illustrates an example subframe 800 according to an aspect of the present disclosure. The subframe 800 is divided into a first slot 802 and a second slot 804, wherein each slot typically comprises 7 symbols in LTE for the normal cyclic prefix (CP) case. Each subframe in LTE spans 1 ms, and therefore, each slot has a duration of 0.5 ms. The first 3 symbols of the backhaul subframe 800 may be used for the Physical Control Format Indicator Channel (PCFICH), the Physical HARQ Indicator Channel (PHICH), and PDCCH. Various EPDCCH structures are available for conveying information in the subframe 800, as illustrated.

With regards to EPDCCH, both localized and distributed transmission of the enhanced control channel may be supported. With localized EPDCCH a single precoder is applied for each physical resource block (PRB) pair. With distributed EPDCCH two precoders cycle through the allocated resources within each PRB pair. At least for localized transmission, and for distributed transmission, where CRS is not used for demodulation of the enhanced control channel, the demodulation of the enhanced control channel may be based on a demodulation reference signal (DMRS) transmitted in the physical resource block(s) (PRB) used for transmission of the enhanced control channel (where transmission, e.g., on antenna ports 7-10 may be used). (The physical resource block (PRB) represents the minimum allocation of symbols and subcarriers. One subframe of 1 ms corresponds to two resource blocks. In LTE the Physical Resource Block is made up of 12 subcarriers for 7 symbols (Normal Cyclic Prefix) or 6 symbols (Extended Cyclic Prefix)). EPDCCH messages may span both first and second slots (e.g., FDM-based e-PDCCH) with a restriction on the maximum number of transport channel (TrCH) bits receivable in a transmission time interval (TTI) (e.g., to allow a relaxation of the processing requirements for the UE). Multiplexing of PDSCH and EPDCCH within a PRB pair may not be permitted. Rank-2 SU-MIMO may not be supported for a single blind decoding attempt. The same scrambling sequence generator may be used for EPDCCH DM-RS as PDSCH DM-RS. Scrambling sequences may be used to distinguish UE-specific reference signals. The scrambling sequence generator of DMRS for EPDCCH on ports 7-10 may be initialized by $$c_{init}=(\lfloor n_s/2 \rfloor+1)\cdot(2X+1)\cdot 2^{16}+n_{SCID}.$$

where $c_{init}$ is the initial scrambling sequence, $n_{SCID}$ is the scrambling identity, and $n_s$ is the slot index. While a focus of traditional LTE design may be on the improvement of spectral efficiency, ubiquitous coverage, enhanced quality of service (QoS) support, this may result in high end devices, such as the state-of-art smartphones and tablets. However, low cost low rate devices may be supported as well. For example, some market projections show that the number of low cost devices may largely exceed today's cell phones. Using low-cost machine type communications (MTC) may result in a reduction of maximum bandwidth, use of a single receive RF chain, reduction of peak rate, reduction of transmit power, and half duplex operations.

Since the intended data rate for the low cost device may be less than 100 kbps, it may be possible to operate the mobile device only at narrowband width to reduce costs. One deployment scenario may be to set aside some narrow bandwidth, e.g. 1.25 MHz, to support the MTC operations. According to another option, low-cost UEs may operate in a large bandwidth, so they may co-exist with regular UEs. For example, low cost UEs may operate at the same large bandwidth (e.g., up to 20 MHz), which may not be helpful in reducing cost and battery power consumption. According to another example, and as will be described in more detail below, low-cost UEs may operate with a smaller bandwidth (e.g., 1.25 MHz).

Figure 9:
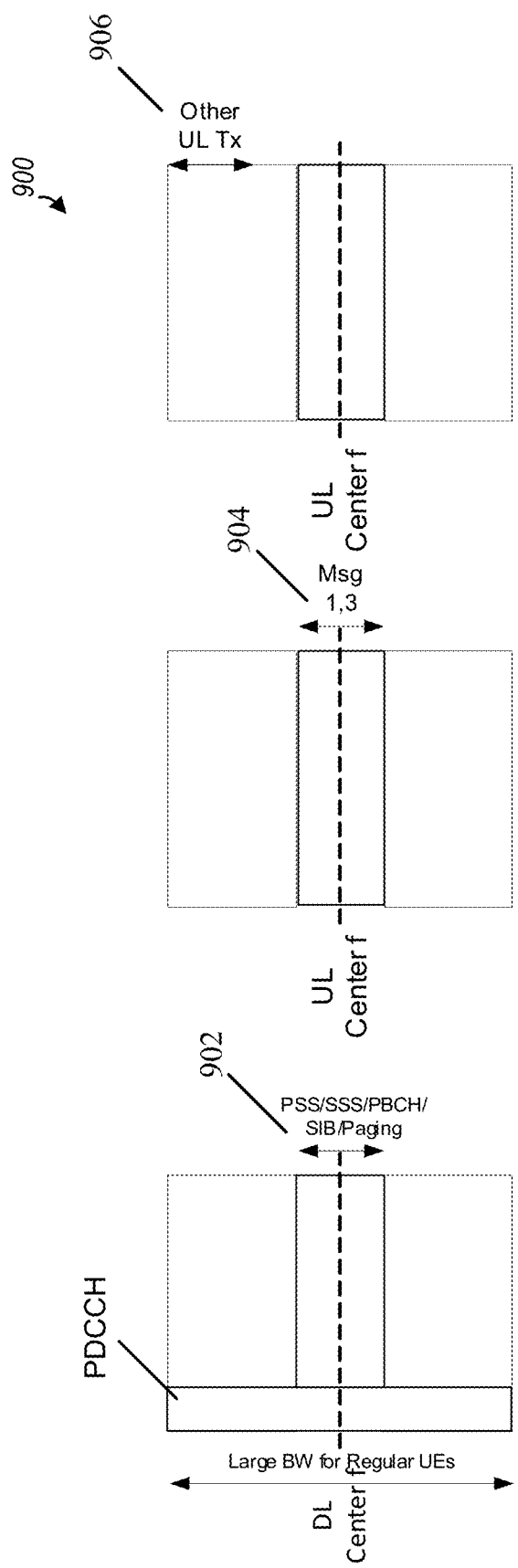
FIG. 9 illustrates an example of a UE operating in a narrow band within a larger bandwidth, according to aspects of the present disclosure.

FIG. 9 illustrates an example 900 of a UE operating in a narrowband of a larger operating bandwidth, according to aspects of the present disclosure. As illustrated, both DL and UL may operate in a small bandwidth (e.g., 1.25 MHz). The small bandwidth may or may not be located in the center of the large bandwidth.

According to one aspect, DL 902 may operate in the center of the large bandwidth for DL. UL RACH procedure (message 1 and message 3) 904 may be in the center of a large bandwidth, in an effort to facilitate access to the system by low cost device. Other UL transmissions 906, however, may be in a different location.

Figure 10:
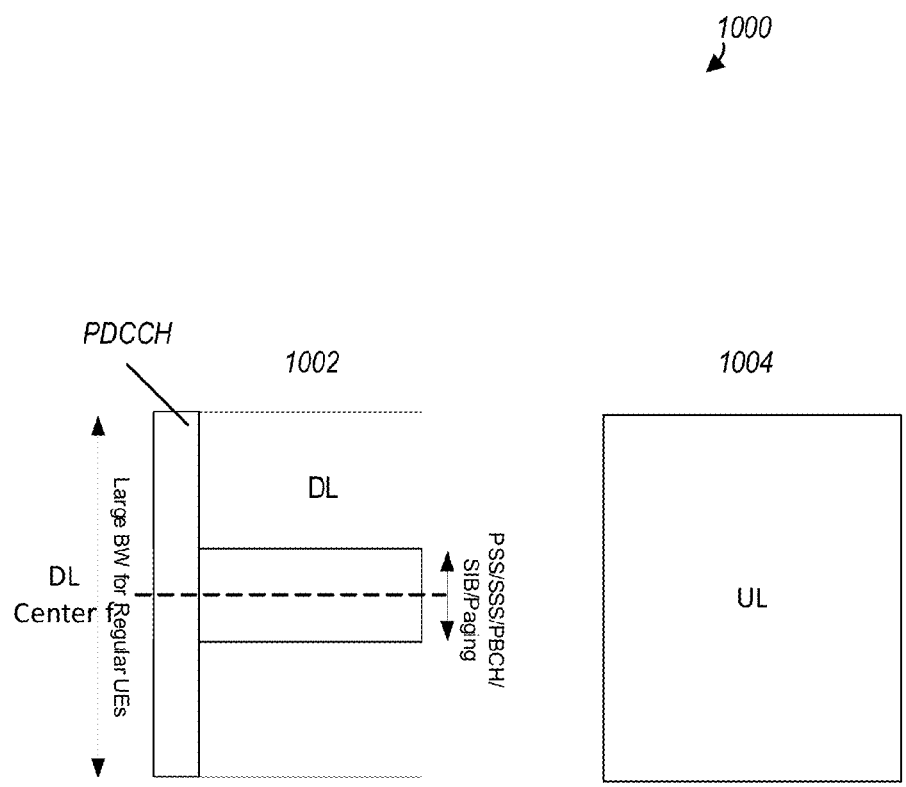
FIG. 10 illustrates an example of a UE operating in a narrow band for downlink and a wide band for uplink, according to aspects of the present disclosure.

FIG. 10 illustrates an example 1000 of possible narrowband options, according to aspects of the present disclosure. As illustrated, the DL 1002 may follow narrow band operations, while UL 1004 may operate in the entire larger bandwidth. Both of the operations may use ePDDCH.

In narrowband operation (e.g., for DL, or UL, or a combination of both), the location of the narrowband for a UE may change within the larger bandwidth over time. Such change may be semi-static (via RRC configuration) or dynamic (via PDCCH). Certain aspects of the present disclosure provide techniques for partitioning the narrow bands within the larger bandwidth and assigning narrowband resources to low cost UEs, where the narrowband is part of the larger system bandwidth.

For DL and/or UL resource allocation, the bitwidth for resource allocation may be based on the larger system bandwidth, such that full flexibility can be achieved. However, the overhead may be large. As an example, considering a 20 MHz system bandwidth, for contiguous resource allocation, 13 bits may be used to address 100 RBs of the 20 MHz system. For bitmap-based resource allocation, 25 bits may be used to address 100 RBs of the 20 MHz system. These resource allocation cases waste limited resources, given that a low cost UE may only be scheduled in a narrow band (e.g., 6 RBs), although the location of the narrow band may change semi-statically or dynamically within the larger system bandwidth. Certain aspects of the present disclosure provide a DL overhead efficient resource allocation method for narrow-band based resource allocation within a larger system bandwidth, which accommodates narrowband resource allocation and dynamic location of the narrowband.

Figure 11:
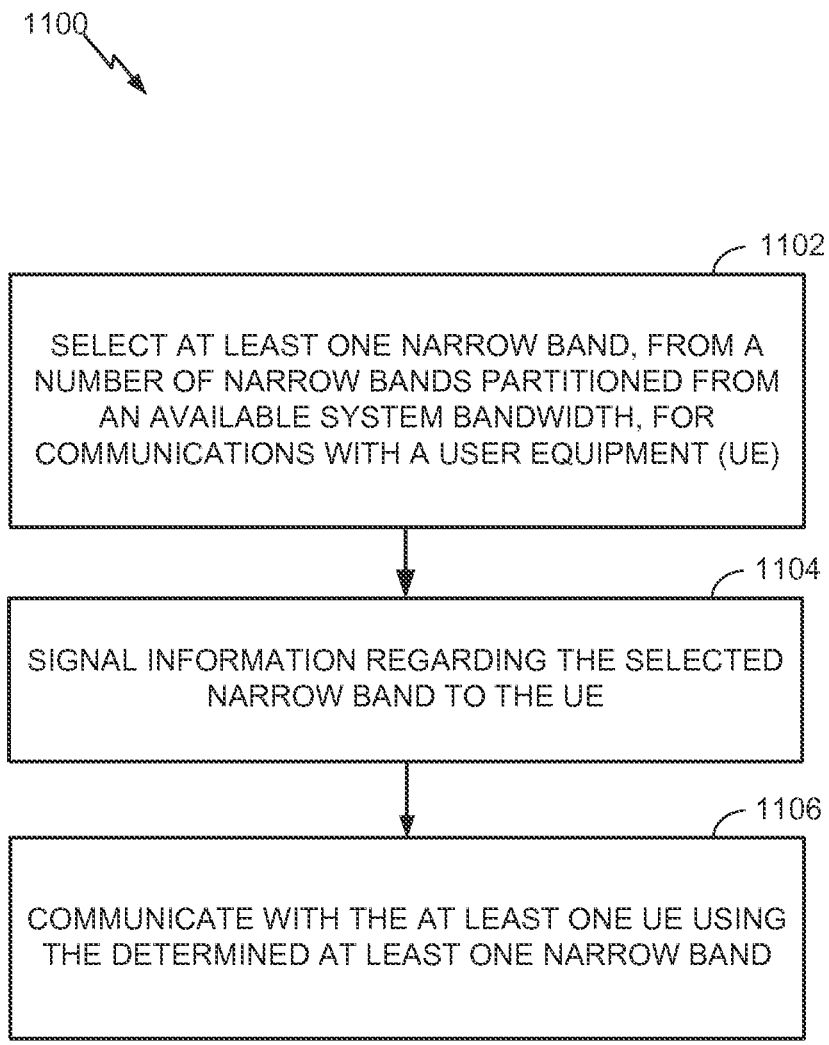
FIG. 11 illustrates example operations for dynamic location of a narrow band from an available system bandwidth, in accordance with certain aspects of the present disclosure.

FIG. 11 illustrates example operations 1100 for dynamic allocation of a narrow band from an available system bandwidth, in accordance with certain aspects of the present disclosure. The operations 1100 may be performed, for example, by a base station or NodeB or eNodeB.

At 1102, the base station may selecting at least one narrow band, from a number of narrow bands partitioned from an available system bandwidth, for communications with a user equipment (UE). At 1104, the base station may signal information regarding the selected narrow band to the UE. At 1106, the base station may start communicating with the UE using the selected narrow band.

Figure 12:
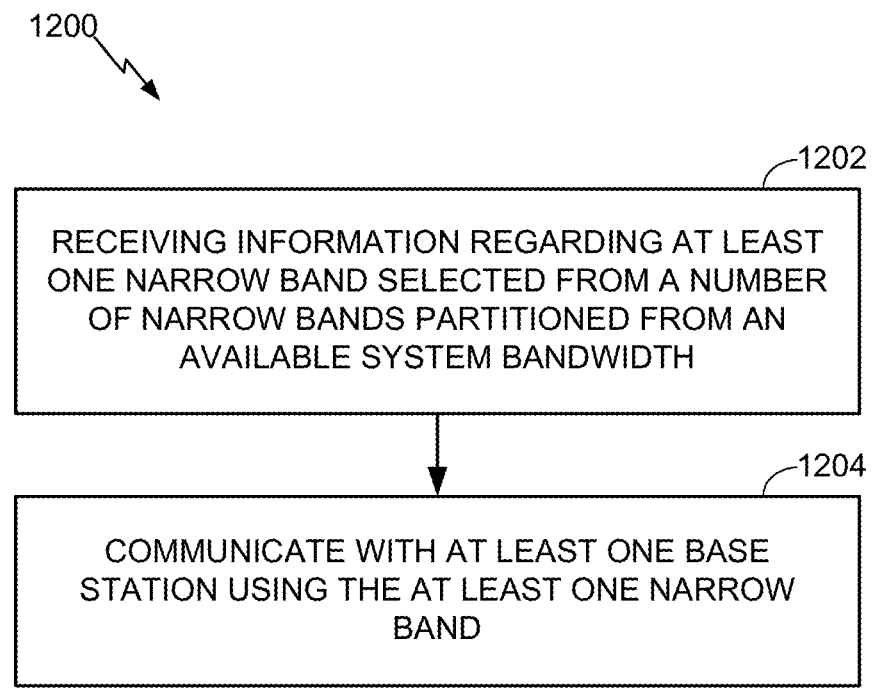
FIG. 12 illustrates example operations for narrow band communication by a user equipment (UE), in accordance with certain aspects of the present disclosure.

FIG. 12 illustrates example operations 1200 for narrow band communication with a base station. The operations 1200 may be performed, for example, by a UE, and may be considered complementary to operations 1100 described above.

At 1202, the UE may receive information regarding at least one narrow band, selected from a number of narrow bands partitioned from an available system bandwidth, for communications with at least one base station. At 1204, the UE may communicating with the at least one base station using the at least one narrow band.

The narrow bands may be contiguous in frequency. For certain aspects, one of the narrow bands may be designated as a primary narrow band for at least one UE. The primary narrow band may generally include at least one of a primary synchronization signal (PSS), a secondary synchronization signal (SSS), a physical broadcast channel (PBCH), or a common search space.

Figure 19:
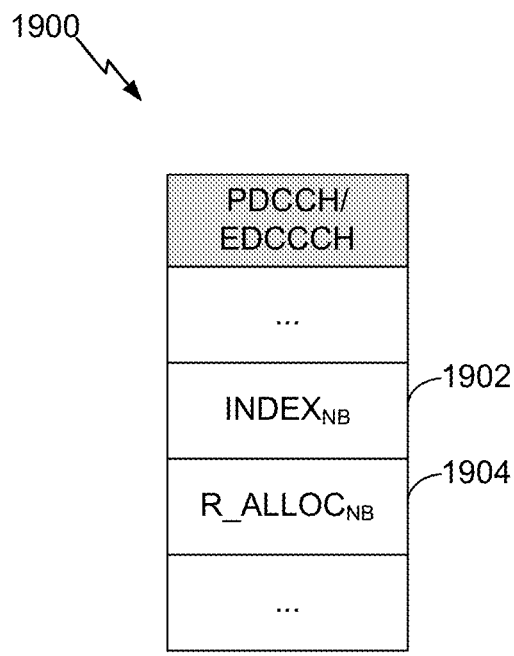
FIG. 19 illustrates example signaling of resource allocation, in accordance with aspects of the present disclosure.

For certain aspects, the base station may signal to the at least one UE an allocation of resources for at least one of downlink communication or uplink communication. The allocation of resources may be signaled via at least one of a PDCCH or an EPDCCH. The signaling generally includes a first field indicating an index of an allocated narrow band, and a second field indicating a resource allocation within the allocated narrow band. As illustrated in FIG. 19, these fields may be included in a PDCCH or EDPCCH 1900. In the illustrated example, a first field 1902 indicating an index of an allocated narrowband and a second field 1904 indicates a resource allocation within the allocated narowband.

For certain aspects, the large system bandwidth may be partitioned with multiple small bandwidths. The partitioning may be predetermined (e.g., specified in the standard) or radio resource control (RRC)-configured. The partitioned regions (or locations) may be orthogonal in frequency, or have partially overlapped frequencies. The partitioning may be the same for DL and UL, or can be different for DL and UL. Although each location (region) is expected to be contiguous in frequency, it may be possible to have frequency non-contiguous regions. The set of locations (regions) may be the same for all subframes or subframe-dependent. The locations may be subframe-dependent due to FDM-based and TDM-based heterogeneous networks (HetNet) where, across subframes, the interference levels experienced by a subband may change.

The resource allocation (RA) scheme, as described above, may be designed to include two fields: an indicator of the location (region) and resource allocation within the location (region). The indicator may be part of the information fields in the control channel (e.g., dynamic) or via RRC (e.g., semi-static). Such resource allocation may be applied to DL traffic only, UL traffic only, or both. Within each region, one or more resource allocation schemes may be supported (e.g., bitmap based, physically and/or virtually contiguous resource allocation, etc.). Such resource allocation may be scheduled by legacy PDCCH and/or EPDCCH.

For certain aspects, some of the narrow bands from the available system bandwidth (i.e., the large band) may be symmetric around the center of the large band (symmetry-based). For instance, PUCCH in UL may be symmetric at band edge in the large bandwidth, and can be excluded from the available bandwidth for partitioning. Therefore, EPDCCH may be designed to occupy symmetrically the two band edges similar to PUCCH.

For certain aspects, some of the narrow bands from the available system bandwidth may be center-based. In other words, one of the narrow bands may include resource blocks centered within the available system bandwidth. For example, at least the center N (e.g., N=6) RBs may be one of the narrow bands. This may be useful, especially considering that signals such as PSS/SSS are located in the center of the large band.

For certain aspects, at least some of the narrow bands may be aligned with a definition of subband for channel state information (CSI) feedback (i.e., consistent with the subband definition for CSI feedback; subband-definition-based). This may be useful to ensure the interference caused by low cost UEs have uniform impact within each subband. For certain aspects, the narrow band size can be different or the same as the subband size. For instance, for a 20 MHz system, a subband size of 8 resource blocks may be defined. The narrow band size can be 6 RBs. Alternatively, the narrow band size can be 8 RBs.

For certain aspects, partitioning the available system bandwidth into the number of narrow bands may control overhead. For instance, PUCCH in UL may be symmetric at band edge in the large bandwidth, and can be excluded from the available bandwidth for partitioning. Moreover, the partitioning may be consistent with the sounding reference signal (SRS) bandwidth (cell-specific and/or UE-specific) definition, in order to ensure good uplink sounding. For certain aspects, the partitioning may align the locations between DL and UL for simpler UE operation. Information concerning uplink channel response may be provided by the SRS in a frequency range greater than that provided for a UE which allows frequency dependent scheduling on the uplink by a base station or NodeB or eNodeB.

Figure 13:
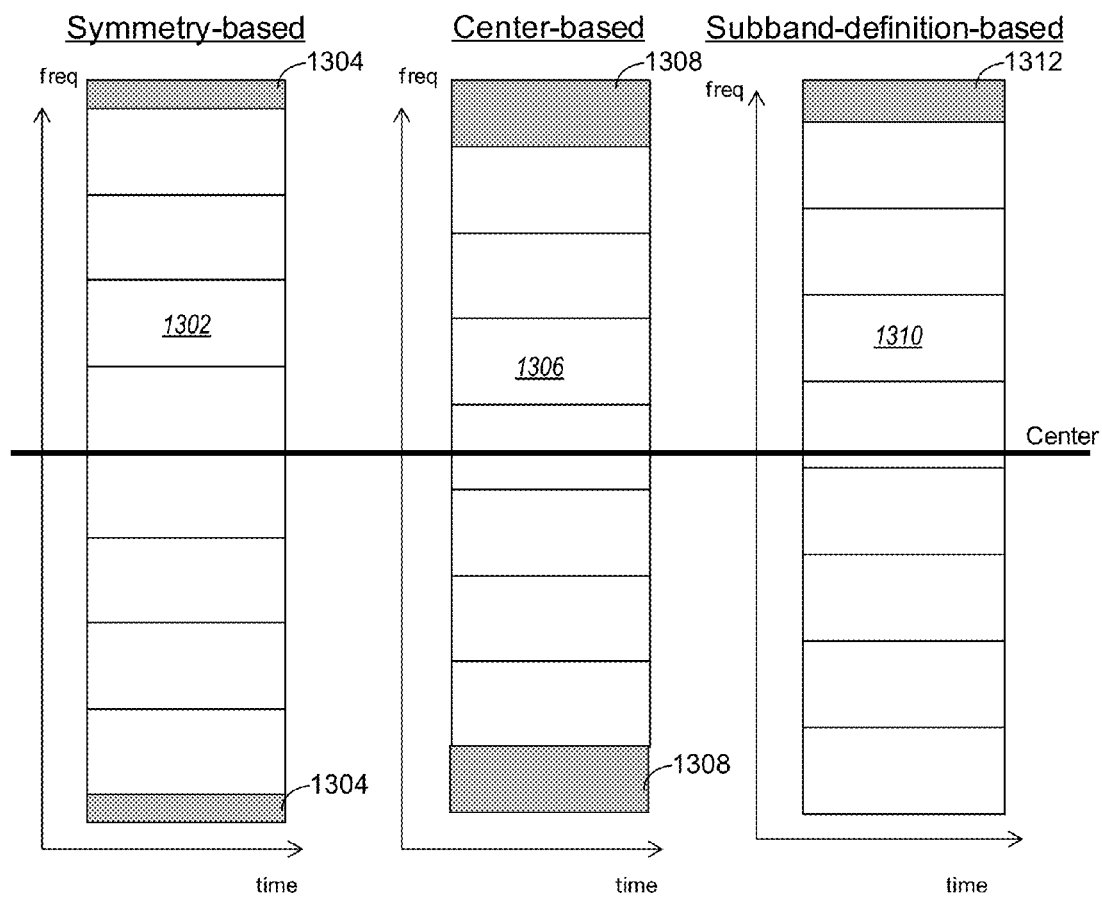
FIG. 13 illustrates the partitioning of an available system bandwidth into a number of narrow bands according to various factors, in accordance with certain aspects of the present disclosure.

The above-described factors for partitioning an available system bandwidth into a number of narrow bands may be in conflict with each other, as illustrated in FIG. 13. With regards to FIG. 13, a large band may have a bandwidth of 50 RBs (10 MHz) and narrowband for low cost UEs is 6 RBs. In one example, system bandwidth may be partitioned using a symmetry-based method, a center-based method, or a subband-definition-based method. Following the symmetry-based method may result in eight narrow bands 1302 (6 RBs) and 1 resource block 1304 at each band edge that may not be usable for low cost UEs (50=8*6+2).

Following the center-based method may result in a narrow band 1306 that includes resource blocks centered within the available system bandwidth. This approach may provide seven narrow bands and four RBs 1308 at each band edge that may be non-usable for low cost UEs (7*6+4*2=50).

Following the subband-definition-based method, a size of subbands 1310 subband size for CSI feedback for 10 MHz is 6 RBs, defined as starting from the lowest frequency, and the last subband 1312 has a size of only 2 RBs. As illustrated, these three approaches result in different definitions of narrow bands.

Figures 14A, 14B:
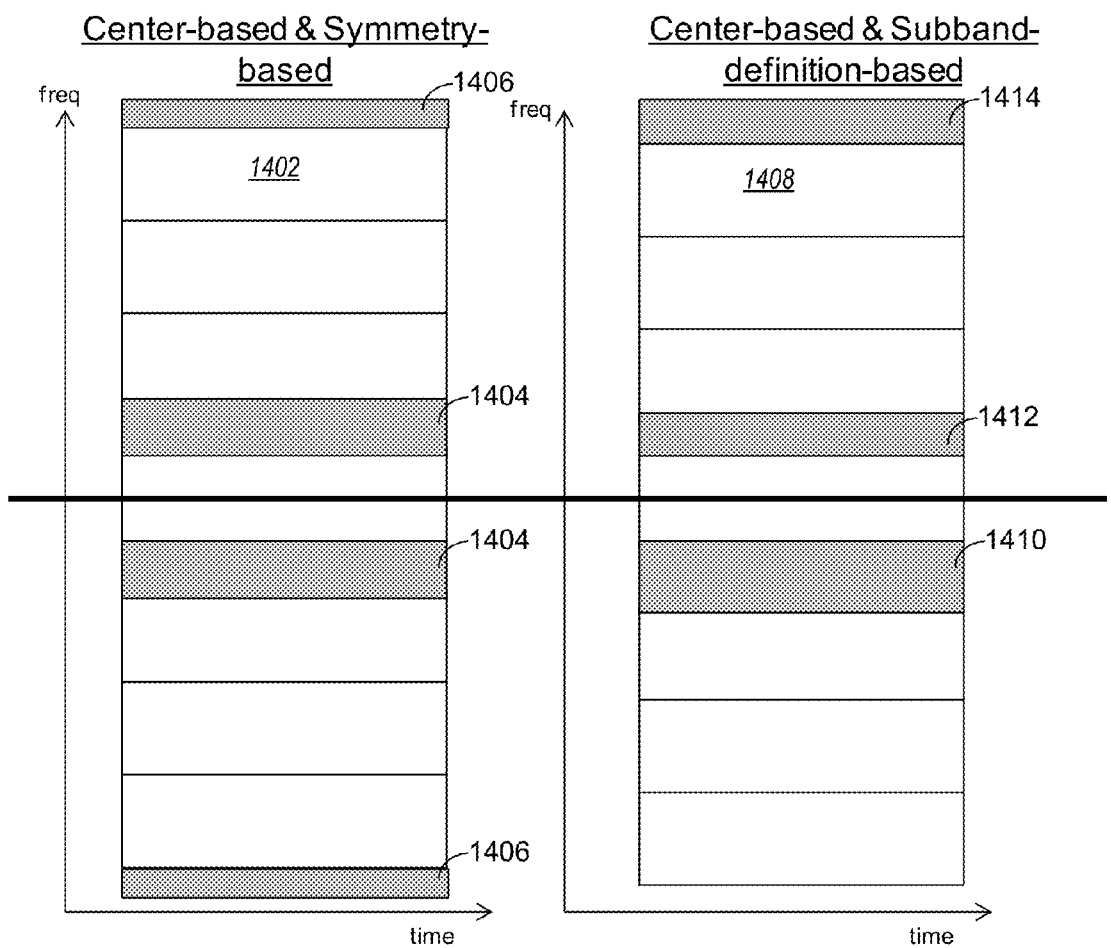
FIGS. 14A-B illustrate the partitioning of available system bandwidth into a number of narrow bands according to at least two factors, in accordance with certain aspects of the present disclosure.

FIGS. 14A-B illustrate the partitioning of available system bandwidth into a number of narrow bands according to at least two of the factors described above, in accordance with certain aspects of the present disclosure.

FIG. 14A illustrates a partitioning satisfying both symmetric-based and center-based properties. This partitioning may provide seven narrow bands 1402 each of six RBs, one RB 1406 at each band edge that may be non-usable for low cost UEs, and three RBs 1404 at each edge of the center narrowband that may be non-usable for low cost UEs.

FIG. 14B illustrates a partitioning satisfying both center-based and subband-definition based properties (e.g., seven narrow bands 1408, two RBs 1414 at the upper band edge, two RBs 1412 at the upper of the center narrowband, and four RBs 1410 at the lower of the center narrowband).

Figure 15:
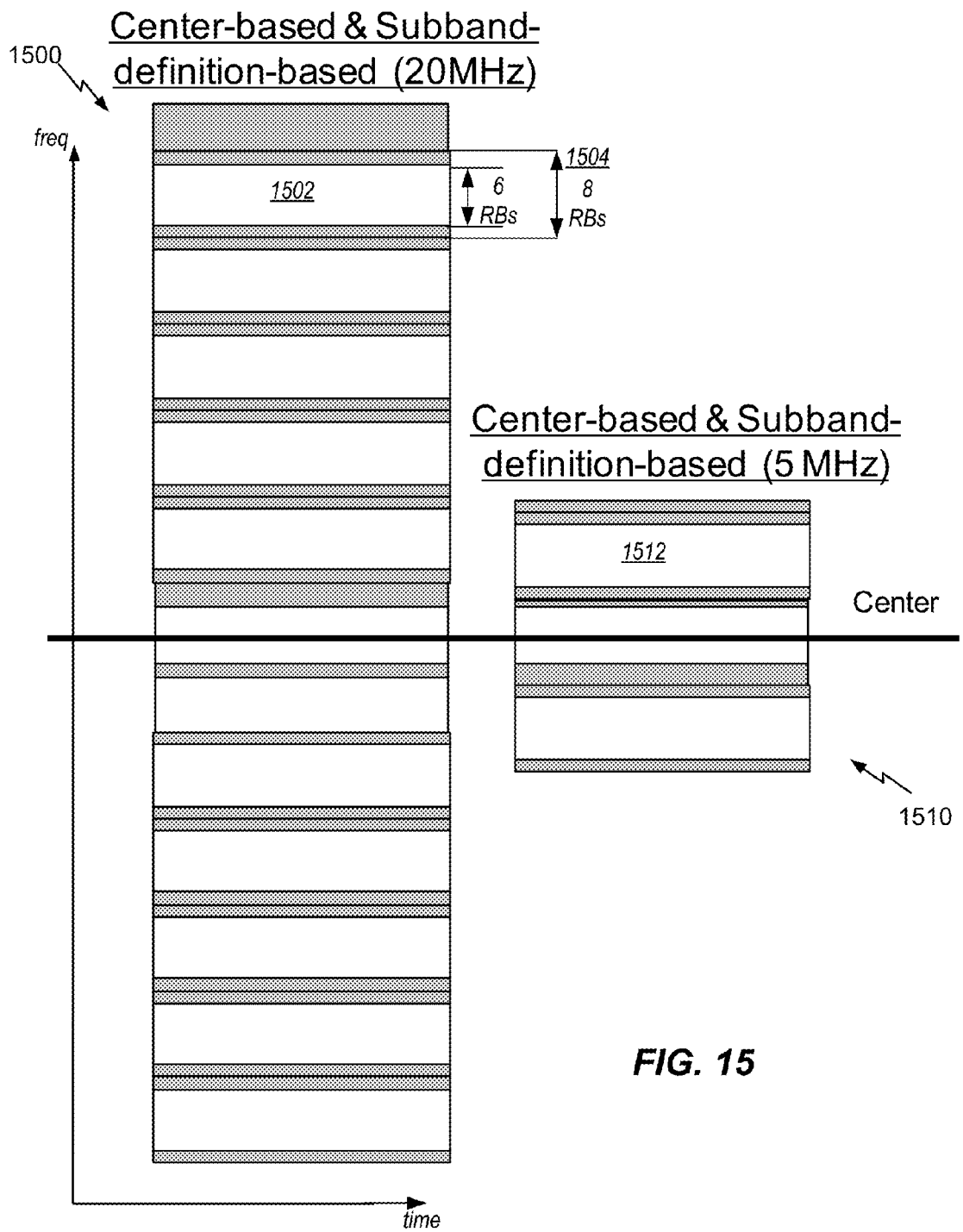
FIG. 15 illustrates the partitioning of other system bandwidths into a number of narrow bands, in accordance with certain aspects of the present disclosure.

FIG. 15 illustrates the partitioning of other system bandwidths into a number of narrow bands 1502 (e.g., 6 RBs), in accordance with certain aspects of the present disclosure. A large band 1500 may have a bandwidth of 20 MHz, and a subband size 1504 for CSI-RS feedback may be 8 RBs. Following partitioning based on center-based and subband-definition-based approaches may provide twelve narrow bands 1502 each of 6 RBs (i.e., 72 RBs). The center narrow band may be in the center of the band (spanning two subbands), while the remaining eleven narrow bands may be within each subband defined for CSI-RS feedback. The unusable RBs for low cost UEs from the bottom to the top frequency are 1, 1+1, 1+1, 1+1, 1+1, 1, 1, 3+1, 1+1, 1+1, 1+1, 1+1, 1+4, a total of 28 RBs.

For a 5 MHz system bandwidth 1510, the subband size for CSI-RS feedback may be four RBS. Two consecutive subbands may join one new subband of 8 RBs. Therefore, 3 narrow bands 1512 may be possible (3*6=18 RBs), one center and two within the new subband. The unusable RBs for low cost UEs from the bottom to the top frequency are 1, 1+1.5, 0.5+1, 1+1, a total of 7 RBs.

Figure 16:
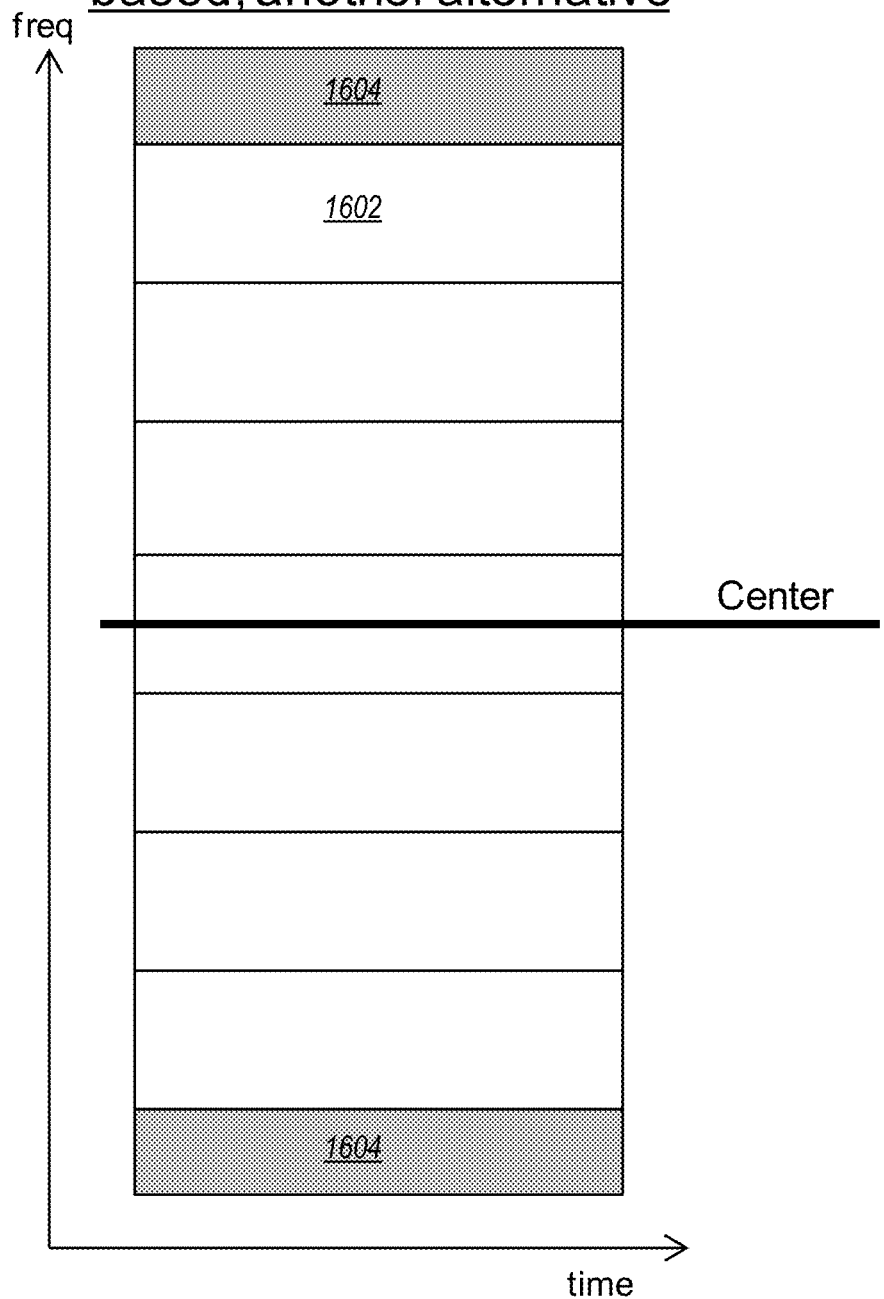
FIG. 16 illustrates an alternative partitioning to the partitioning illustrated in FIG. 9, in accordance with certain aspects of the present disclosure.

The unusable RBs for low cost UEs that were described above may be used for regular UEs. The partitioning of the unusable RBs as shown in the earlier figures may also take other forms. For example, for center and symmetry-based approach illustrated in FIG. 14A, one RB 1406 at each band edge and three RBs 1404 at each edge of the center narrowband may be non-usable for low cost UEs. However, as illustrated in FIG. 16, it is possible to have a consecutive seven narrow bands 1602 (each of 6 RBs) which are usable, and then 4 RBs 1604 at each band edge as unusable for low cost UEs. Such partitioning may be cell-specific or UE-specific (e.g., different UEs may be indicated a different partitioning scheme). Some methods may be better suitable for DL (e.g., center and subband-based), while some other methods may be better suitable for UL (e.g., center and symmetry-based).

Figure 17:
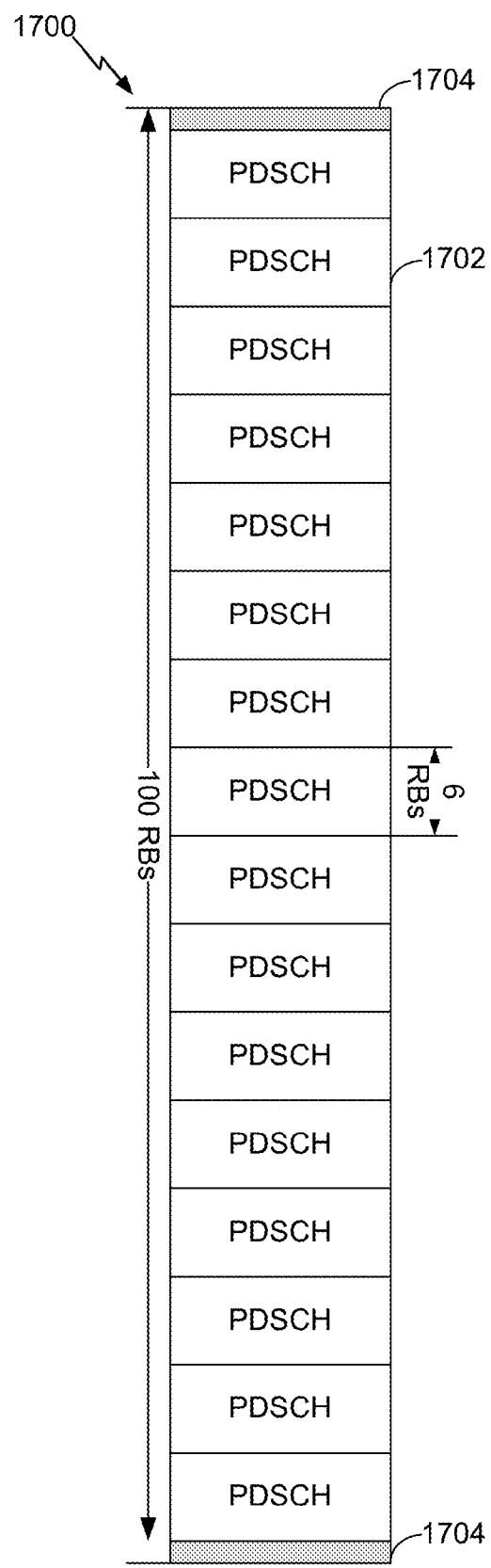
FIG. 17 illustrates a bitwidth for resource allocation, in accordance with certain aspects of the present disclosure.

FIG. 17 illustrates a bitwidth for resource allocation, in accordance with certain aspects of the present disclosure. Assuming a 20 MHz wideband 1700 and 6 RBs narrow bands 1702, DL symmetry-based partitioning may provide sixteen regions, each of size 6 RBs. Four RBs (100−16*6=4), shown as 2 RBs 1704 at each band edge, may not be scheduled. While shown at the edge, these RBs 1704 could be at some other locations. With sixteen regions, four bits may be required to indicate which region to schedule. Alternatively, a smaller number of bits may be used to indicate the region. For instance, a UE may receive an indication (e.g., predetermined or via RRC) that only eight out of the sixteen regions may be used (i.e., only three bits may be necessary for the indication). Within each region of six RBs, a resource allocation scheme may indicate which RBs of the region are scheduled. Therefore, fewer bits may be required for the indication when compared to resource allocation that is based on the larger system bandwidth.

For certain aspects, a UE and a base station may communicate over a plurality of narrow bands over different time periods. The communications may include hopping across the plurality of narrow bands. In other words, hopping across regions may be enabled across different UL non-adaptive transmissions. The hopping within a region (e.g., across slots within a subframe) may be disabled or enabled. The order of hopping across regions may be predetermined, implicitly derived, or signaled. For example, fixed order hopping, always from region N to region N+1 between two adjacent transmissions (or mirror hopped (from region N to region M−N−1, where M is the total number of regions)). As another example, the hopping sequence may be based on CURRENT_TX_NB (i.e., the number of transmissions that have been performed for a UL transport block). As another example, there may be RRC signaling for the possible sets for hopping and/or the order of hopping within the set.

For region based DL/UL resource assignments, it may be desirable to prohibit back-to-back (e.g., two adjacent subframes) transmissions or receptions using two different regions in order to provide enough time for RF-re-tuning between the two different regions. This may be in addition to another rule for half-duplex UEs where there could be a gap in between transmission and reception transitions. Back-to-back transmissions or receptions using the same region may be performed.

Interaction of Data, CSI Measurements, and SRS Transmissions for Low Cost UEs

In LTE Rel-8/9/10, channel state information (CSI) feedback may be based on certain subframes. The measurement subframes for channel and interference may not necessarily be the same. For periodic CSI feedback, the measurement subframes may be at least 4 ms earlier than the subframe carrying the periodic CSI feedback. For aperiodic CSI feedback, the measurement subframes may be the subframes carrying the PDCCH triggering the aperiodic CSI feedback (at least in terms of interference measurements). Certain subframes may not be valid subframes for measurement (e.g., MBSFN subframes for DL transmission modes 1 to 8). So far, the measurement bandwidth for CSI feedback may cover the entire bandwidth.

Sounding Reference Signal (SRS) may be used for many reasons including, for example, UL link adaptation, DL scheduling under channel reciprocity (especially for TDD systems), CoMP operation, etc. There may be two types of SRS configurations: cell-specific and UE-specific.

Cell-specific SRS configurations may have SRS transmission instances (up to every UL subframe) and SRS transmission bandwidth. Cell-specific SRS bandwidth may cover most of the uplink system bandwidth, typically excluding the PUCCH region. UE-specific configurations may have SRS transmission instances (within cell-specific SRS transmission instances), and a transmission bandwidth (as small as 4 RBs). The configuration may also include parameters which define the SRS such as cyclic shift, transmission comb (0 or 1), frequency starting position, whether to hop, number of antenna port(s), etc. SRS hopping may be enabled to allow cyclically sounding the entire or a fraction of the cell-specific SRS bandwidth.

Both periodic and aperiodic SRS are supported in Rel-10. Once configured, periodic SRS may have an indefinite duration (e.g., until being de-configured by RRC). Periodic SRS may be transmitted in UE-specific periodic SRS subframes (e.g., a subset of cell-specific SRS subframes). Aperiodic SRS may be triggered by a PDCCH (e.g., PDCCH for UL grants, format 0 (1-bit) and format 4 (2-bit); PDCCH for DL grants, formats 1A/2B/2C). Grants are used by base stations to schedule the use of resources. Aperiodic SRS may have a one-shot duration once triggered and may be transmitted in UE-specific aperiodic SRS subframes (a subset of cell-specific SRS subframes).

To support single carrier waveform in the UL, and to transmit two or more UL channels/signals in one subframe, a shortened PUCCH format may can be configured, for example, on a per cell basis. In the second slot, instead of utilizing all the symbols, the last symbol may not used by PUCCH (shortened), making it possible to transmit SRS in the last symbol of the subframe.

Shortened PUCCH format may be applicable to PUCCH formats 1/1a/1b (carrying SR/ACK/NAK), and PUCCH format 3 (carrying SR/ACK/NAK in Rel-10, and CSI in Rel-11). Shortened PUCCH may not be supported for PUCCH formats 2/2a/2b (carrying ACK/NAK and CSI).

A UE may be informed of whether a shortened PUCCH format is enabled or not via parameter ackNackSRS-SimultaneousTransmission. If not, regular PUCCH format may be used (such that PUCCH utilizes all the symbols in the second slot) and the SRS may be dropped if it collides with a PUCCH transmission from the same UE. If the shortened PUCCH format is enabled, then in the cell specific SRS subframes, the UE may transmit HARQ-ACK and SRS using the shortened PUCCH format. This shortened PUCCH format may be used in a cell specific SRS subframe even if the UE does not transmit SRS in that subframe (to ensure orthogonal PUCCH among UEs using the same RB).

To support single carrier waveform in the UL, a PUSCH may rate match around the last symbols in some subframes. In a UE-specific aperiodic SRS subframe, the PUSCH for the UE may be rate-matched around the last symbol, even if aperiodic SRS is not transmitted. In a UE-specific periodic SRS subframe, PUSCH for the UE may be rate-matched around the last symbol, if the UE also transmits a periodic SRS in the same subframe, or if the UE does not transmit a periodic SRS in the same subframe, but the PUSCH has resources overlapping with cell-specific SRS bandwidth.

In narrowband operation for DL, the location of the narrowband for a UE may change within the larger bandwidth over time. Such change may be semi-static (via RRC configuration) or dynamic (via PDCCH). CSI feedback may be restricted to the narrowband, or may be based on the entire large band.

In narrowband operation for the UL, the location of the narrowband for a UE may change within the larger bandwidth over time. Such change may be semi-static (via RRC configuration) or dynamic (via the PDCCH). At the same time, the SRS may be transmitted by the UE and may be able to sound the larger bandwidth over time. The cycling of SRS (over different subbands) and the location change of PUSCH or PUCCH may not be in sync. Indeed, generally speaking, the cycling of an SRS may be predetermined (as in Rel-8) or differently designed for the eNB to know the best UL subband for scheduling, while the location of PUSCH and/or PUCCH may be based on the eNB's scheduling needs, which typically take into account an SRS of previous transmissions, and other conditions (such as interference, load, resource collision, etc.).

As a result, in a UL subframe, it may be possible to have a PUSCH and/or PUCCH in one location, and the SRS in another location, not completely within the narrowband condition in which the UE is to perform. Additionally, the minimum UE-specific SRS bandwidth may be 4 RBs, while the narrowband for PUSCH and/or PUCCH may be 6 RBs.

According to aspects of the present disclosure, for narrowband low cost UEs, CSI measurements may also be based on the narrowband for the PDSCH. If the narrowband for PDSCH changes over time, the narrowband for measurement may also change over time. If the change for PDSCH is semi-static (or dynamic), the change for measurement may accordingly be semi-static (or dynamic).

The narrowband location for PDSCH may not necessarily be the same as the narrowband location for measurement, since the measurement may help the eNB schedule PDSCH in a preferred narrowband location based on earlier CSI feedback.

For periodic CSI, the definition of bandwidth parts and/or subbands for feedback may be aligned with the narrowband bandwidth. For instance, if the narrowband bandwidth is 6 RBs, 6 RB may be used as the subband size for periodic CSI feedback, one subband per bandwidth part. The set of possible bandwidth parts for feedback may be the same as the set of narrowbands within the large bandwidth. The cycling of bandwidth parts may be pre-determined, implicitly derived, or RRC configured (e.g., from bandwidth part 1 to N, where N is the total number of bandwidth parts), and subframe-dependent. RRC may configure a set of bandwidth parts and the order in which the bandwidth parts are cycled).

For aperiodic CSI, the narrowband location may be semi-statically configured or dynamically indicated. For example, explicit bits may indicate which narrowband location the UE may use for CSI feedback. For example, the narrowband location may be linked with the SRS location of an UL.

It is possible that in one subframe, the narrowband for measurement and the narrowband for EPDCCH/PDSCH transmissions may not be the same. According to one aspect, the eNB may try to avoid such a misalignment. According to another aspect, one of them may be dropped, in one example, the one for measurement. According to aspects, the CSI report may be dropped as well. Alternatively, CSI may still be reported, but for the same narrowband as EPDCCH/PDSCH (in such a case, the report is for an intended narrowband). Alternatively, the UE may report a dummy CSI value. The UE may use the measurement narrowband from an earlier valid subframe (in such a case, the report may be a bit outdated).

According to aspects of the present disclosure, two adjacent subframes may have different narrowbands, one for measurement, and the other for EPDCCH/PDSCH transmissions. RF re-tuning between the two different narrowbands may need a few hundreds of microseconds. Such a case may be prohibited. Alternatively, the measurement RS (e.g., CSI-RS) may be placed in symbols providing enough time gap for RF re-turning. For example, if the measurement is in subframe n, and EPDCCH/PDSCH in subframe n+1 of a different narrowband, the CSI-RS symbols may be in the first slot of subframe n.

As another example, if EPDCCH/PDSCH is in subframe n and measurement is in subframe n+1 of a different narrowband, the CSI-RS symbols can be in the second slot of subframe n+1. The CSI-RS may be at the end of the two symbols of the first slot as well.

Figure 18:
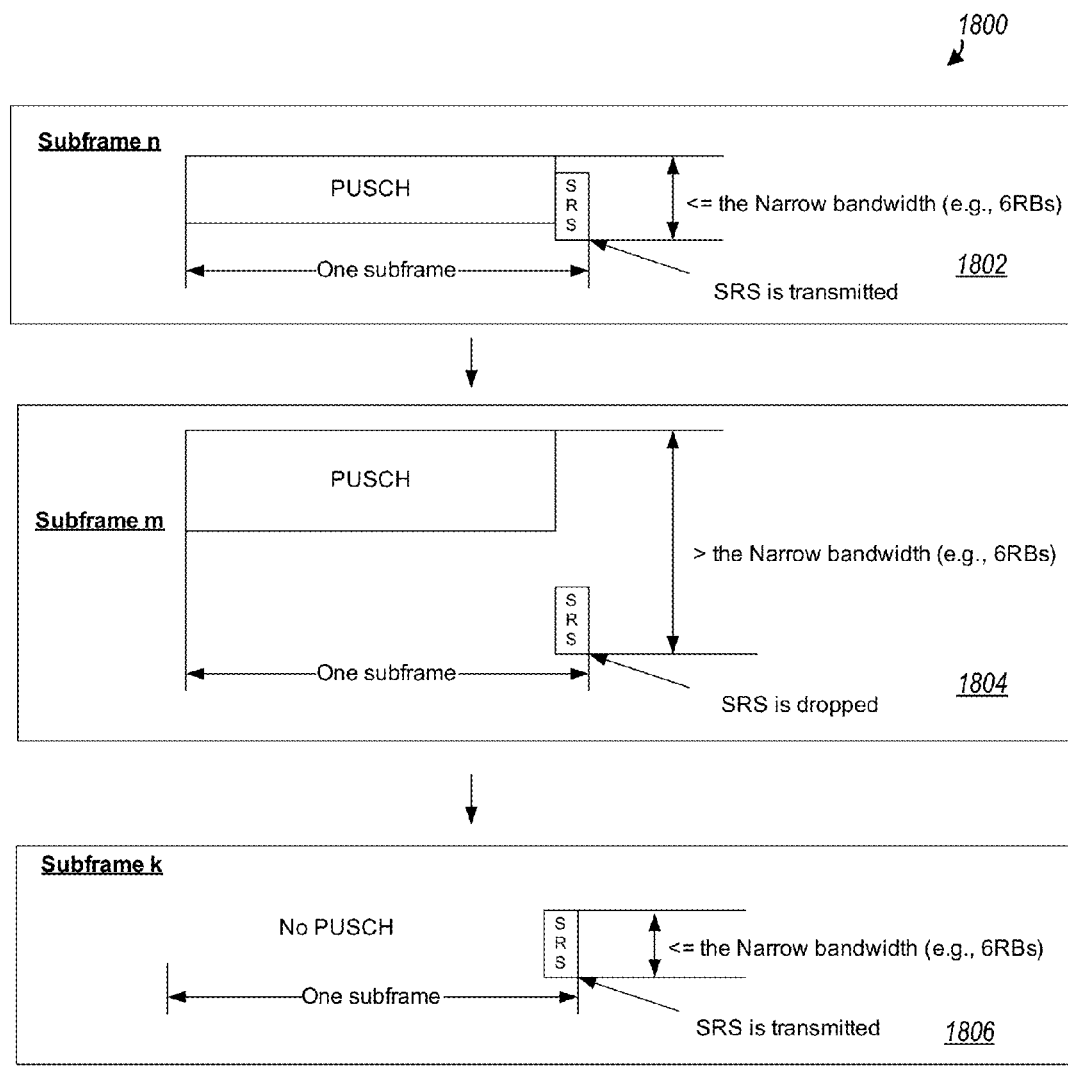
FIG. 18 illustrates an example of uplink transmission, according to aspects of the present disclosure.

FIG. 18 illustrates an example of uplink transmissions 1800, according to aspects of the present disclosure. In order to satisfy the narrowband condition for the UL, an SRS may be dropped whenever the PUCCH and/or PUSCH and SRS may not be transmitted in one subframe within the narrow bandwidth. Such determination may be done on a per subframe basis.

At 1802, the SRS may be transmitted since the SRS and PUSCH and/or PUCCH are within one subframe of the narrow bandwidth. At 1804, the SRS may be dropped since it is not in the narrow bandwidth of transmission. However, this may lead to excessive dropping of SRS. Accordingly, the collision between PUSCH/PUCCH and SRS in a subframe may be minimized. This may be achieved by eNB scheduling and RRC configuration management (e.g., only schedule PUSCH in non-UE-specific periodic and/or aperiodic SRS subframes).

According to another aspect of the present disclosure, the SRS may be prioritized over PUSCH transmission. At 1806, the SRS may be transmitted, since it is within the narrow bandwidth. For example, a PHICH triggered non-adaptive PUSCH re-transmission may be dropped, while the SRS may be transmitted.

According to aspects of the present disclosure, the SRS may be dropped if in the next subframe, there is a PUSCH and/or PUCCH transmissions by the UE in a different narrowband compared with the SRS transmission, if, for example, the UE may not have enough time for RF-retuning. In order to possibly have SRS transmissions, SRS transmissions may be moved to earlier symbols such that enough guard time may be provided for RF-retuning.

Additionally or alternatively, a special design may be considered for the UL even if PUSCH and/or PUCCH and SRS transmissions are in the same narrowband (in the same or adjacent subframes), but have different transmit powers. For instance, in the same subframe, PUSCH/PUCCH and SRS may have different transmit power in the current power control design. For instance, SRS in subframe n and PUSCH/PUCCH in subframe n+1 may also have different transmit powers. In this case, SRS may be dropped because of power transitions (typically in the order of 40 microseconds). Alternatively, SRS may be transmitted with the same transmit power as PUSCH/PUCCH (to eliminate power transitions). Additionally, demodulation reference signals (DM-RS) designed for PUSCH/PUCCH may be used for sounding, for example, when the SRS is dropped.

As described above, SRS bandwidth may generally follow the same narrowband requirement as PUSCH. For narrowband operation, existing SRS bandwidths may be inefficient (e.g., for 6 RBs narrowband, 4 RB SRS may be inefficient). According to aspects of the present disclosure, a more narrowband friendly SRS bandwidth may be introduced. For example, for 6 RBs narrowband, 6 RBs, 3 RBs, 2 RBs, or 1 RB SRS bandwidth(s) may be used.

In some cases, a UE may determine, within available system bandwidth, a narrow band of operation for communications between the UE and a base station and, based on the narrow band, resources to be used for reference signal measurement and reporting.

As described above, determining the narrow band of operation may comprise determining a narrow band of operation for downlink transmissions from the base station. Determining resources to be used for reference signal measurement and reporting may comprise determining downlink resources with at least one RS the UE should measure for channel measurement, interference measurement, or both channel measurement and interference measurement.

According to an aspect, determining the narrow band of operation may comprise determining a narrow band of operation for uplink transmissions to the base station. Determining resources to be used for reference signal measurement and reporting may comprise determining uplink resources for transmitting sounding reference signals (SRS)

The various operations of methods described above may be performed by any suitable combination of hardware and/or software component(s) and/or module(s).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications by a base station, comprising:
   selecting at least one narrow band, from a number of narrow bands partitioned from an available system bandwidth, for communications with a user equipment (UE);
   signaling information regarding the selected narrow band to the UE wherein the information comprises an indication of a resource allocation within the narrow band, a first field indicating an index of an allocated narrow band, and a second field indicating the resource allocation within the allocated narrow band; and
   communicating with the UE using the selected narrow band.

2. The method claim 1, wherein one of the narrow bands is designated as a primary narrow band for the UE.

3. The method of claim 2, wherein the primary narrow band contains at least one of a primary synchronization signal (PSS), a secondary synchronization signal (SSS), a physical broadcast channel (PBCH), or a common search space.

4. The method of claim 1, wherein the narrow bands partitioned from the available system bandwidth are contiguous in frequency.

5. The method of claim 1, wherein at least one of the narrow bands comprises resource blocks centered within the available system bandwidth.

6. The method of claim 5, wherein at least two of the narrow bands are symmetric around a center of the available system bandwidth.

7. The method of claim 1, wherein at least one of the narrow bands is aligned with a set of subbands partitioned for downlink channel state information measurement.

8. The method of claim 1, wherein the at least one narrow band is for at least one of uplink transmission or downlink transmission and wherein the at least one of the narrow bands for uplink transmissions is partitioned differently than the at least one of the narrow bands for downlink transmissions.

9. The method of claim 1, wherein the information is signaled via at least one of a physical downlink control channel (PDCCH) or an enhanced PDCCH (EPDCCH).

10. The method of claim 1, wherein the communications between the UE and the base station involves a plurality of the number of narrow bands over different time periods.

11. The method of claim 10, wherein the communications comprise hopping across the plurality of the number of narrow bands.

12. The method of claim 1, further comprising prohibiting use of different narrow bands for communications between the UE and the base station in adjacent subframes.

13. The method of claim 1, wherein:
said selecting the at least one narrow band comprises scheduling a narrow band of operation for uplink transmissions of at least one data channel; and
wherein the method further comprises scheduling uplink resources for at least one reference signal (RS), based on the narrow band of operation for uplink transmissions of at least one data channel to the base station.

14. The method of claim 13, further comprising dropping a report of said RS if the narrow band for said RS and the narrowband for said at least one data channel are not aligned.

15. The method of claim 13, wherein said selecting the at least one narrowband is done semi-statically.

16. The method of claim 13, wherein said selecting the at least one narrowband is done dynamically.

17. The method of claim 16, wherein a bandwidth of the uplink resources for receiving a SRS comprises a fraction of the bandwidth of the narrow band of operation for uplink transmission of said at least one data channel.

18. The method of claim 1, further comprising determining a bandwidth for a sounding reference signal based on the bandwidth of the narrow band.

19. The method of claim 18, wherein the bandwidth for the narrow band is divisible by the bandwidth for the sounding reference signal.

20. The method of claim 1, further comprising determining a narrow band for downlink channel state information (CSI) measurement.

21. The method of claim 20, wherein the narrow band for downlink CSI measurement is determined based on the selected narrowband.

22. The method of claim 20, wherein the narrow band for downlink CSI measurement is separately signaled.

23. A method for wireless communications by a user equipment (UE), comprising:
receiving information regarding at least one narrow band, selected from a number of narrow bands partitioned from an available system bandwidth, for communications with at least one base station and wherein the information comprises indication of a resource allocation within the narrow band, a first field indicating an index of an allocated narrow band, and a second field indicating the resource allocation within the allocated narrow band; and
communicating with the at least one base station using the at least one narrow band.

24. The method claim 23, wherein one of the narrow bands is designated as a primary narrow band for the UE.

25. The method of claim 24, wherein the primary narrow band contains at least one of a primary synchronization signal (PSS), a secondary synchronization signal (SSS), a physical broadcast channel (PBCH), or a common search space.

26. The method of claim 23, wherein the narrow bands partitioned from the available system bandwidth are contiguous in frequency.

27. The method of claim 23, wherein at least one of the narrow bands comprises resource blocks centered within the available system bandwidth.

28. The method of claim 27, wherein at least two of the narrow bands are symmetric around a center of the available system bandwidth.

29. The method of claim 23, wherein at least one of the narrow bands is aligned with a set of subbands partitioned for downlink channel state information measurement.

30. The method of claim 23, wherein the at least one narrow band is for at least one of uplink transmission or downlink transmission and wherein the at least one of the narrow bands for uplink transmissions is partitioned differently than the at least one of the narrow bands for downlink transmissions.

31. The method of claim 23, wherein the information is signaled via at least one of a physical downlink control channel (PDCCH) or an enhanced PDCCH (EPDCCH).

32. The method of claim 23, wherein the communications between the UE and the base station involves a plurality of the number of narrow bands over different time periods.

33. The method of claim 32, wherein the communications comprise hopping across the plurality of the number of narrow bands.

34. The method of claim 23, wherein use of different narrow bands for communications between the UE and the base station in adjacent subframes is prohibited.

35. The method of claim 23, wherein:
said information indicates a narrow band of operation for uplink transmissions of at east one data channel to the base station; and
the method further comprises transmitting one reference signal (RS) based on the narrow band of operation for uplink transmissions of said at least one data channel to the base station.

36. The method of claim 35, further comprising not transmitting a report of said RS if the narrow band for said RS and the narrowband for said at least one data channel are not aligned.

37. The method of claim 35, further comprising placing said RS in the same narrow band in a subframe as that of the data channel in an adjacent subframe.

38. The method of claim 35, further comprising receiving bits indicating which narrowband location the UE transmits a RS.

39. The method of claim 38, wherein a bandwidth of the uplink resources for transmitting SRS comprises a fraction of the bandwidth of the narrow band of operation for uplink transmission of said at least one data channel.

40. The method of claim 23, further comprising determining a bandwidth for a sounding reference signal based on the bandwidth of the narrow band.

41. The method of claim 40, wherein the bandwidth for the narrow band is divisible by the bandwidth for the sounding reference signal.

42. The method of claim 23, further comprising determining a narrow band for downlink channel state information (CSI) measurement.

43. The method of claim 42, wherein the narrow band for downlink CSI measurement is determined based the selected narrowband.

44. The method of claim 42, wherein the narrow band for downlink CSI measurement is separately signaled.

45. An apparatus for wireless communications by a base station, comprising:
   means for selecting at least one narrow band, from a number of narrow bands partitioned from an available system bandwidth, for communications with a user equipment (UE);
   means for signaling information regarding the selected narrow band to the UE wherein the information comprises an indication of a resource allocation within the narrow band, a first field indicating an index of an allocated narrow band, and a second field indicating the resource allocation within the allocated narrow band; and
   means for communicating with the UE using the selected narrow band.

46. The apparatus claim 45, wherein one of the narrow bands is designated as a primary narrow band for the UE.

47. The apparatus of claim 46, wherein the primary narrow band contains at least one of a primary synchronization signal (PSS), a secondary synchronization signal (SSS), a physical broadcast channel (PBCH), or a common search space.

48. The apparatus of claim 45, wherein the narrow bands partitioned from the available system bandwidth are contiguous in frequency.

49. The apparatus of claim 45, wherein at least one of the narrow bands comprises resource blocks centered within the available system bandwidth.

50. The apparatus of claim 49, wherein at least two of the narrow bands are symmetric around a center of the available system bandwidth.

51. The apparatus of claim 45, wherein at least one of the narrow bands is aligned with a set of subbands partitioned for downlink channel state information measurement.

52. The apparatus of claim 45, wherein the at least one narrow band is for at least one of uplink transmission or downlink transmission and wherein the at least one of the narrow bands for uplink transmissions is partitioned differently than the at least one of the narrow bands for downlink transmissions.

53. The apparatus of claim 45, wherein the information is signaled via at least one of a physical downlink control channel (PDCCH) or an enhanced PDCCH (EPDCCH).

54. The apparatus of claim 45, wherein the communications between the UE and the base station involves a plurality of the number of narrow bands over different time periods.

55. The apparatus of claim 54, wherein the communications comprise hopping across the plurality of the number of narrow bands.

56. The apparatus of claim 45, further comprising means for prohibiting use of different narrow bands for communications between the UE and the base station in adjacent subframes.

57. The apparatus of claim 45, wherein said means for selecting the at least one narrow band comprises:
   means for scheduling a narrow band of operation for uplink transmissions of at least one data channel; and
   wherein the apparatus further comprises means for scheduling uplink resources for at least one reference signal (RS), based on the narrow band of operation for uplink transmissions of at least one data channel to the base station.

58. The apparatus of claim 57, further comprising means for dropping a report of said RS if the narrow band for said RS and the narrowband for said at least one data channel are not aligned.

59. The apparatus of claim 57, wherein said means for selecting the at least one narrowband selects the at least one narrowband semi-statically.

60. The apparatus of claim 57, wherein said means for selecting the at least one narrowband selects the at least one narrowband dynamically.

61. The apparatus of claim 60, wherein a bandwidth of the uplink resources for receiving a SRS comprises a fraction of the bandwidth of the narrow band of operation for uplink transmission of said at least one data channel.

62. The apparatus of claim 45, further comprising means for determining a bandwidth for a sounding reference signal based on the bandwidth of the narrow band.

63. The apparatus of claim 62, wherein the bandwidth for the narrow band is divisible by the bandwidth for the sounding reference signal.

64. The apparatus of claim 45, further comprising means for determining a narrow band for downlink channel state information (CSI) measurement.

65. The apparatus of claim 64, wherein the narrow band for downlink CSI measurement is determined based on the selected narrowband.

66. The apparatus of claim 64, wherein the narrow band for downlink CSI measurement is separately signaled.

67. An apparatus for wireless communications by a user equipment (UE), comprising:
   means for receiving information regarding at least one narrow band, selected from a number of narrow bands partitioned from an available system bandwidth, for communications with at least one base station wherein the information comprises an indication of a resource allocation within the narrow band, a first field indicating an index of an allocated narrow band, and a second field indicating the resource allocation within the allocated narrow band; and
   means for communicating with the at least one base station using the at least one narrow band.

68. The apparatus claim 67, wherein one of the narrow bands is designated as a primary narrow band for the UE.

69. The apparatus of claim 68, wherein the primary narrow band contains at least one of a primary synchronization signal (PSS), a secondary synchronization signal (SSS), a physical broadcast channel (PBCH), or a common search space.

70. The apparatus of claim 67, wherein the narrow bands partitioned from the available system bandwidth are contiguous in frequency.

71. The apparatus of claim 67, wherein at least one of the narrow bands comprises resource blocks centered within the available system bandwidth.

72. The apparatus of claim 71, wherein at least two of the narrow bands are symmetric around a center of the available system bandwidth.

73. The apparatus of claim 67, wherein at least one of the narrow bands is aligned with a set of subbands partitioned for downlink channel state information measurement.

74. The apparatus of claim 67, wherein the at least one narrow band is for at least one of uplink transmission or downlink transmission and wherein the at least one of the narrow bands for uplink transmissions is partitioned differently than the at least one of the narrow bands for downlink transmissions.

75. The apparatus of claim 67, wherein the information is signaled via at least one of a physical downlink control channel (PDCCH) or an enhanced PDCCH (EPDCCH).

76. The apparatus of claim 67, wherein the communications between the UE and the base station involves a plurality of the number of narrow bands over different time periods.

77. The apparatus of claim 76, wherein the communications comprise hopping across the plurality of the number of narrow bands.

78. The apparatus of claim 67, wherein use of different narrow bands for communications between the UE and the base station in adjacent subframes is prohibited.

79. The apparatus of claim 67, wherein:
   said information indicates a narrow band of operation for uplink transmissions of at east one data channel to the base station; and
   the apparatus further comprises means for transmitting one reference signal (RS) based on the narrow band of operation for uplink transmissions of said at least one data channel to the base station.

80. The apparatus of claim 79, wherein the means for communicating is configured to not transmit a report of said RS if the narrow band for said RS and the narrowband for said at least one data channel are not aligned.

81. The apparatus of claim 79, further comprising means for placing said RS in the same narrow band in a subframe as that of the data channel in an adjacent subframe.

82. The apparatus of claim 79, further comprising means for receiving bits indicating which narrowband location the UE transmits a RS.

83. The apparatus of claim 82, wherein a bandwidth of the uplink resources for transmitting SRS comprises a fraction of the bandwidth of the narrow band of operation for uplink transmission of said at least one data channel.

84. The apparatus of claim 67, further comprising means for determining a bandwidth for a sounding reference signal based on the bandwidth of the narrow band.

85. The apparatus of claim 84, wherein the bandwidth for the narrow band is divisible by the bandwidth for the sounding reference signal.

86. The apparatus of claim 67, further comprising means for determining a narrow band for downlink channel state information (CSI) measurement.

87. The apparatus of claim 86, wherein the narrow band for downlink CSI measurement is determined based the selected narrowband.

88. The apparatus of claim 86, wherein the narrow band for downlink CSI measurement is separately signaled.

89. An apparatus for wireless communications by a base station, comprising:
   at least one processor configured to select at least one narrow band, from a number of narrow bands partitioned from an available system bandwidth, for communications with a user equipment (UE), signal information regarding the selected narrow band to the UE wherein the information comprises an indication of a resource allocation within the narrow band, a first field indicating an index of an allocated narrow band, and a second field indicating the resource allocation within the allocated narrow band, and communicate with the UE using the selected narrow band; and
   a memory coupled with the at least one processor.

90. The apparatus claim 89, wherein one of the narrow bands is designated as a primary narrow band for the UE.

91. The apparatus of claim 90, wherein the primary narrow band contains at least one of a primary synchronization signal (PSS), a secondary synchronization signal (SSS), a physical broadcast channel (PBCH), or a common search space.

92. The apparatus of claim 89, wherein the narrow bands partitioned from the available system bandwidth are contiguous in frequency.

93. The apparatus of claim 89, wherein at least one of the narrow bands comprises resource blocks centered within the available system bandwidth.

94. The apparatus of claim 93, wherein at least two of the narrow bands are symmetric around a center of the available system bandwidth.

95. The apparatus of claim 89, wherein at least one of the narrow bands is aligned with a set of subbands partitioned for downlink channel state information measurement.

96. The apparatus of claim 89, wherein the at least one narrow band is for at least one of uplink transmission or downlink transmission and wherein the at least one of the narrow bands for uplink transmissions is partitioned differently than the at least one of the narrow bands for downlink transmissions.

97. The apparatus of claim 89, wherein the information is signaled via at least one of a physical downlink control channel (PDCCH) or an enhanced PDCCH (EPDCCH).

98. The apparatus of claim 89, wherein the communications between the UE and the base station involves a plurality of the number of narrow bands over different time periods.

99. The apparatus of claim 98, wherein the communications comprise hopping across the plurality of the number of narrow bands.

100. The apparatus of claim 89, wherein the at least one processor is configured to prohibit use of different narrow bands for communications between the UE and the base station in adjacent subframes.

101. The apparatus of claim 89, wherein the at least one processor is configured to schedule a narrow band of operation for uplink transmissions of at least one data channel and schedule uplink resources for at least one reference signal (RS), based on the narrow band of operation for uplink transmissions of at least one data channel to the base station.

102. The apparatus of claim 101, wherein the at least one processor is further configured to drop a report of said RS if the narrow band for said RS and the narrowband for said at least one data channel are not aligned.

103. The apparatus of claim 101, wherein the at least one processor is configured to select the at least one narrowband is done semi-statically.

104. The apparatus of claim 101, wherein the at least one processor is configured to select the at least one narrowband is done dynamically.

105. The apparatus of claim 104, wherein a bandwidth of the uplink resources for receiving a SRS comprises a fraction of the bandwidth of the narrow band of operation for uplink transmission of said at least one data channel.

106. The apparatus of claim 89, wherein the at least one processor is configured to determine a bandwidth for a sounding reference signal based on the bandwidth of the narrow band.

107. The apparatus of claim 106, wherein the bandwidth for the narrow band is divisible by the bandwidth for the sounding reference signal.

108. The apparatus of claim 89, wherein the at least one processor is further configured to determine a narrow band for downlink channel state information (CSI) measurement.

109. The apparatus of claim 108, wherein the narrow band for downlink CSI measurement is determined based on the selected narrowband.

110. The apparatus of claim 108, wherein the narrow band for downlink CSI measurement is separately signaled.

111. An apparatus for wireless communications by a user equipment (UE), comprising:
at least one processor configured to receive information regarding at least one narrow band, selected from a number of narrow bands partitioned from an available system bandwidth, for communications with at least one base station and communicate with the at least one base station using the at least one narrow band wherein the information comprises an indication of a resource allocation within the narrow band, a first field indicating an index of an allocated narrow band, and a second field indicating the resource allocation within the allocated narrow band; and
a memory coupled with the at least one processor.

112. The apparatus claim 111, wherein one of the narrow bands is designated as a primary narrow band for the UE.

113. The apparatus of claim 112, wherein the primary narrow band contains at least one of a primary synchronization signal (PSS), a secondary synchronization signal (SSS), a physical broadcast channel (PBCH), or a common search space.

114. The apparatus of claim 111, wherein the narrow bands partitioned from the available system bandwidth are contiguous in frequency.

115. The apparatus of claim 111, wherein at least one of the narrow bands comprises resource blocks centered within the available system bandwidth.

116. The apparatus of claim 115, wherein at least two of the narrow bands are symmetric around a center of the available system bandwidth.

117. The apparatus of claim 111, wherein at least one of the narrow bands is aligned with a set of subbands partitioned for downlink channel state information measurement.

118. The apparatus of claim 111, wherein the at least one narrow band is for at least one of uplink transmission or downlink transmission and wherein the at least one of the narrow bands for uplink transmissions is partitioned differently than the at least one of the narrow bands for downlink transmissions.

119. The apparatus of claim 111, wherein the information is signaled via at least one of a physical downlink control channel (PDCCH) or an enhanced PDCCH (EPDCCH).

120. The apparatus of claim 111, wherein the communications between the UE and the base station involves a plurality of the number of narrow bands over different time periods.

121. The apparatus of claim 120, wherein the communications comprise hopping across the plurality of the number of narrow bands.

122. The apparatus of claim 111, wherein use of different narrow bands for communications between the UE and the base station in adjacent subframes is prohibited.

123. The apparatus of claim 111, wherein:
said information indicates a narrow band of operation for uplink transmissions of at east one data channel to the base station; and
the at least one processor is further configured to transmit one reference signal (RS) based on the narrow band of operation for uplink transmissions of said at least one data channel to the base station.

124. The apparatus of claim 123, the at least one processor is further configured to not transmit a report of said RS if the narrow band for said RS and the narrowband for said at least one data channel are not aligned.

125. The apparatus of claim 123, the at least one processor is further configured to place said RS in the same narrow band in a subframe as that of the data channel in an adjacent subframe.

126. The apparatus of claim 123, the at least one processor is further configured to receive bits indicating which narrowband location the UE transmits a RS.

127. The apparatus of claim 126, wherein a bandwidth of the uplink resources for transmitting SRS comprises a fraction of the bandwidth of the narrow band of operation for uplink transmission of said at least one data channel.

128. The apparatus of claim 111, the at least one processor is further configured to determine a bandwidth for a sounding reference signal based on the bandwidth of the narrow band.

129. The apparatus of claim 128, wherein the bandwidth for the narrow band is divisible by the bandwidth for the sounding reference signal.

130. The apparatus of claim 116, the at least one processor is further configured to determine a narrow band for downlink channel state information (C SI) measurement.

131. The apparatus of claim 130, wherein the narrow band for downlink CSI measurement is determined based the selected narrowband.

132. The apparatus of claim 130, wherein the narrow band for downlink CSI measurement is separately signaled.

133. A non-transitory computer readable medium for wireless communications by a base station, the non-transitory computer readable medium having instructions stored thereon for:
selecting at least one narrow band, from a number of narrow bands partitioned from an available system bandwidth, for communications with a user equipment (UE);
signaling information regarding the selected narrow band to the UE wherein the information comprises an indication of a resource allocation within the narrow band, a first field indicating an index of an allocated narrow band, and a second field indicating the resource allocation within the allocated narrow band; and
communicating with the UE using the selected narrow band.

134. A non-transitory computer readable medium for wireless communications by a user equipment (UE), the non-transitory computer readable medium having instructions stored thereon for:
receiving information regarding at least one narrow band, selected from a number of narrow bands partitioned from an available system bandwidth, for communications with at least one base station wherein the information comprises an indication of a resource allocation within the narrow band, a first field indicating an index of an allocated narrow band, and a second field indicating the resource allocation within the allocated narrow band; and
communicating with the at least one base station using the at least one narrow band.

* * * * *